(12) United States Patent
Deering et al.

(10) Patent No.: US 6,885,384 B2
(45) Date of Patent: Apr. 26, 2005

(54) METHOD OF CREATING A LARGER 2-D SAMPLE LOCATION PATTERN FROM A SMALLER ONE BY MEANS OF X, Y ADDRESS PERMUTATION

(75) Inventors: Michael F. Deering, Los Altos, CA (US); Nathaniel David Naegle, Pleasanton, CA (US); Ranjit S. Oberoi, Saratoga, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 219 days.

(21) Appl. No.: 10/387,357

(22) Filed: Mar. 12, 2003

(65) Prior Publication Data

US 2003/0179199 A1 Sep. 25, 2003

Related U.S. Application Data

(60) Provisional application No. 60/397,598, filed on Jul. 22, 2002, and provisional application No. 60/363,596, filed on Mar. 12, 2002.

(51) Int. Cl.[7] .............................. G09G 5/00; G06F 12/02
(52) U.S. Cl. ....................... 345/613; 345/611; 345/614; 345/503; 345/531; 345/564; 345/566
(58) Field of Search ................................. 345/611, 613, 345/614, 503, 531, 564, 566

(56) References Cited

U.S. PATENT DOCUMENTS

| | | |
|---|---|---|
| 4,897,806 A | 1/1990 | Cook et al. |
| 5,025,400 A | 6/1991 | Cook et al. |
| 5,239,624 A | 8/1993 | Cook et al. |
| 5,757,375 A * | 5/1998 | Kawase ...................... 345/613 |
| 6,091,425 A * | 7/2000 | Law ............................ 345/619 |
| 6,501,483 B1 * | 12/2002 | Wong et al. ................ 345/611 |
| 6,593,933 B1 * | 7/2003 | Xu et al. .................... 345/586 |
| 6,768,491 B1 * | 7/2004 | Lefebvre et al. ........... 345/581 |
| 2002/0140706 A1 * | 10/2002 | Peterson et al. ........... 345/611 |

OTHER PUBLICATIONS

Michael F. Deering and Scott R. Nelson. Leo: A System for Cost Effective 3D Shaded Graphics. In Proceedings of the 20th Annual Conference on Computer Graphics and Interactive Techniques. Sep. 1993, pp 101–108.*

Alexander Keller. Instant Radiosity. In Proceedings of the 24th Annual Conference on Computer Graphics and Interactive Techniques. Aug. 1997.*

* cited by examiner

*Primary Examiner*—Ulka J. Chauhan
(74) *Attorney, Agent, or Firm*—Meyertons Hood Kivlin Kowert & Goetzel, P.C.; Jeffrey C. Hood

(57) ABSTRACT

A system and method are disclosed for reproducing a pre-selected larger 2-D sample location pattern from a smaller one by means of X,Y address permutation. This method, for example, allows hardware to effectively reproduce a pre-selected set of sample locations for an array of 128×128 sample bins from a smaller set of pre-selected sample locations for an array of 2×2 sample bins. A permutation logic unit may use a first portion of an address for a sample bin B to identify a corresponding 2-D transformation, apply the inverse of the transformation to a second portion of the sample bin address to identify the corresponding bin of the 2×2 array of sample bins, and apply the transformation to the sample locations stored in the corresponding bin to reproduce the sample locations pre-selected for sample bin B.

45 Claims, 25 Drawing Sheets

Populate a 2 x 2 Sample Bin Array 1 to 16 Sample Locations / Bin

Select an Array of Transformations from:

| iy | ix | s | Transformation |
|---|---|---|---|
| 0 | 0 | 0 | none |
| 0 | 0 | 1 | swapXY: mirror about y = -x -1 |
| 0 | 1 | 0 | invertX: mirror about y |
| 0 | 1 | 1 | rotate 270 degrees clockwise |
| 1 | 0 | 0 | invertY: mirror about x |
| 1 | 0 | 1 | rotate 90 degrees clockwise |
| 1 | 1 | 0 | rotate 180 degrees |
| 1 | 1 | 1 | mirror about y = x |

Apply Inner
Transformation
Array to 2 x 2
Array to obtain
a 16 x 16
Inner Bin Array
(IBA)

Apply Outer
Transformation
Array to Inner Bin
Array to obtain
a 128 x 128
Outer Bin Array
(OBA)

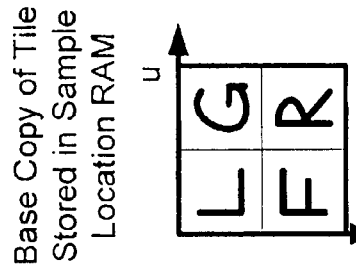

Base Copy of Tile Stored in Sample Location RAM function f = Rotate Clockwise 90 degrees

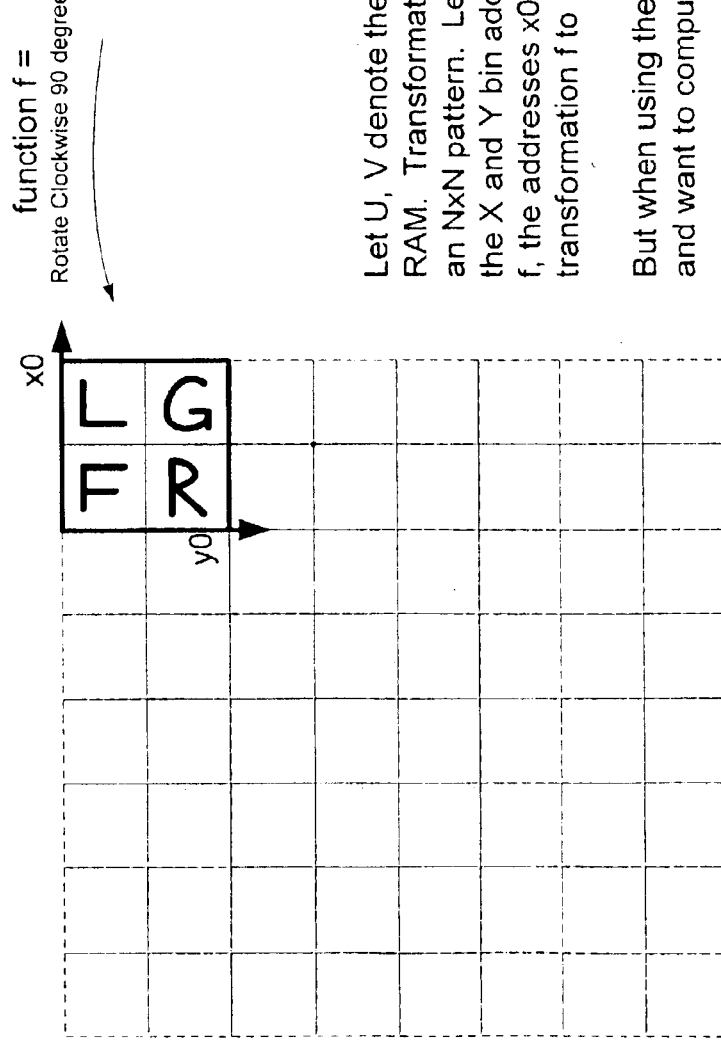

Let U, V denote the addresses supplied to the sample location RAM. Transformations are applied to the base copy to build up an NxN pattern. Let X0 and Y0 denote the least significant bit of the X and Y bin address respectively. For a given transformation f, the addresses x0 and y0 are determined by applying the transformation f to u and v:

$$(x0,y0) = f(u,v).$$

But when using the sample generation circuit, we have x0 and y0 and want to compute u and v. So we apply the inverse function:

METHOD OF CREATING A LARGER 2-D SAMPLE LOCATION PATTERN FROM A SMALLER ONE BY MEANS OF X, Y ADDRESS PERMUTATION

PRIORITY CLAIMS

This application claims the benefit of U.S. Provisional Application No. 60/397,598, filed on Jul. 22, 2002, entitled "Method of Creating a Larger 2-D Sample Location Pattern from a Smaller One by Means of X,Y Address Permutation", invented by Michael F. Deering, Nathaniel David Naegle, and Ranjit S. Oberoi, which is hereby incorporated by reference in its entirety as though fully and completely set forth herein.

Furthermore, this application claims the benefit of U.S. Provisional Application No. 60/363,596 filed on Mar. 12, 2002 entitled "Dynamically Adjusting Sample Density and/ or Number of Rendering Passes in a Graphics System", which is hereby incorporated by reference in its entirety as though fully and completely set forth herein.

BACKGROUND OF THE INVENTION

1. Field of the Invention

This invention relates generally to the field of computer graphics and, more particularly, to a high performance graphics system which implements super-sampling.

2. Description of the Related Art

A computer system typically relies upon its graphics system for producing visual output on a computer screen or display device. Early graphics systems were only responsible for taking what the processor produced as output and displaying that output on the screen. In essence, they acted as simple translators or interfaces. Modern graphics systems, however, incorporate graphics processors with a great deal of processing power. They now act more like coprocessors rather than simple translators. This change is due to the recent increase in both the complexity and amount of data being sent to the display device. For example, modern computer displays have many more pixels, greater color depth, and are able to display images that are more complex with higher refresh rates than earlier models. Similarly, the images displayed are now more complex and may involve advanced techniques such as anti-aliasing and texture mapping.

Since graphics systems typically perform only a limited set of functions, they may be customized and therefore far more efficient at graphics operations than the computer's general-purpose central processor. Graphics system processors are specialized for computing graphical transformations, so they tend to achieve better results than the general-purpose CPU used by the computer system. In addition, they free up the computer's CPU to execute other commands while the graphics system is handling graphics computations. The popularity of graphical applications, and especially multimedia applications, has made high performance graphics systems a common feature of computer systems. Most computer manufacturers now bundle a high performance graphics system with their computer systems.

Early graphics systems were limited to performing two-dimensional (2D) graphics. Their functionality has since increased to support three-dimensional (3D) wire-frame graphics, 3D solids, and now includes support for three-dimensional (3D) graphics with textures and special effects such as advanced shading, fogging, alpha-blending, and specular highlighting.

While the number of pixels is an important factor in determining graphics system performance, another factor of equal import is the quality of the image. Various methods are used to improve the quality of images, such as anti-aliasing, alpha blending, and fogging. While various techniques may be used to improve the appearance of computer graphics images, they also have certain limitations. In particular, they may introduce their own image aberrations or artifacts, and are typically limited by the density of pixels displayed on the display device.

To obtain images that are more realistic, some graphics systems have implemented super-sampling by generating more than one sample per pixel. By calculating more samples than pixels (i.e., super-sampling), a more detailed image is calculated than can be displayed on the display device. For example, a graphics system may calculate a plurality of samples for each pixel to be output to the display device. After the samples are calculated, they are then combined, convolved, or filtered to form the pixels that are stored in the frame buffer and then conveyed to the display device. Using pixels formed in this manner may create a more realistic final image because overly abrupt changes in the image may be smoothed by the filtering process.

As used herein, the term "sample" refers to calculated information that indicates the color of the sample and possibly other information, such as depth (z), transparency, etc., of a particular point on an object or image. For example, a sample may comprise the following component values: a red value, a green value, a blue value, a z value, and an alpha value (e.g., representing the transparency of the sample).

As a result, a graphics system is desired which is capable of improved performance levels to increase not only the number of pixels rendered, but also the quality of the image rendered. In addition, a graphics system is desired which is capable of utilizing increases in processing power to improve graphics effects.

Please refer to Volume I of "Principles of Digital Image Synthesis" by Andrew S. Glassner, pages 437–440, ©1995 by Morgan Kaufman Publishers, Inc., for description of a methodology for avoiding periodicity in a sampling pattern.

SUMMARY

In one set of embodiments, a system and method are disclosed for generating a larger 2-D sample location pattern from a smaller one by means of X,Y address permutation. This method may allow hardware to reproducibly generate a set of sample locations for an array of bins (e.g. a 128×128 array of bins) from a smaller set of pre-selected sample locations populating an n×n tile of bins (e.g. a 2×2 tile of bins), where n is a positive integer.

In some embodiments, a permutation logic unit may use a first portion of a two-dimensional address of a sample bin B to identify a corresponding 2-D transformation, apply the inverse of the corresponding 2-D transformation to a second portion of the two-dimensional bin address to identify a corresponding bin of the n×n tile of bins, and apply the corresponding 2-D transformation to the sample locations (or sample displacements) stored in the corresponding bin of the n×n tile of bins to generate the sample locations for sample bin B.

A graphics accelerator that utilizes a pattern of permutations (also referred to as a pattern of transformations) of a pre-selected set of sample locations may include a plurality of sample generation circuits (also referred to as permutation logic units) for generating sample locations. The graphics accelerator may include one or more rendering pipelines and one or more filtering units. Each rendering pipeline may utilize a sample generation circuit to generate sample locations conforming to the pattern of permutations, render sample values for the sample locations, discard the sample locations, and store the sample values in a sample memory. Each filtering unit may read a set of sample values from the sample memory, utilize a sample generation circuit to regenerate the corresponding sample locations, and then filter the sample values and sample locations to generate pixel values. The graphics accelerator may output the video pixels to one or more display devices.

In one set of embodiments, the sample generation circuit includes: a) a transformation control unit that receives a first portion of a two-dimensional bin address specifying a location of a bin in sample space and identifies a corresponding transformation based on the first portion and a pre-selected pattern of transformations that span sample space, b) an address transform unit that receives a second portion of the two-dimensional bin address and applies an inverse of the identified transformation to the second portion, thereby generating a memory address defining a bin from an array of bins containing pre-selected sample displacements, c) a sample location memory that stores a set of pre-selected sample displacements for an array of bins and outputs a first sequence of sample displacements in response to receiving the memory address, and d) an output transform unit that applies the identified transformation to the first sequence of sample displacements to generate a second output sequence of sample displacements. In some embodiments, the transformation control unit generates a code corresponding to the identified transformation and outputs the code to the address transform unit and the output transform unit. A set of transformation codes corresponds to the group of eight two-dimensional transformations generated by all possible combinations of (a) mirroring about the x axis, (b) mirroring about the y axis, and (c) mirroring about the line y=x. (This group of eight transformations may be equivalently described as the group of rigid motions of the plane which carry the square onto the square.) The transformation control unit may implement a mapping of each state of the first portion of the two-dimensional bin address into a transformation code corresponding to one of the group of eight transformations. The sample generation circuit may include a lookup table, which stores a transformation code for each state of the first portion of the two-dimensional address. The transformation control unit may be a combinational logic network.

The address transform circuit may include two multiplexors and a pair of XOR gates, where a least significant bit of the transformation code controls the two multiplexors. The output transform circuit may include two multiplexors and a pair of XOR gates, where a least significant bit of the transformation code controls the two multiplexors.

A method for generating a pre-selected pattern of permuted sample locations spanning sample space may include one or more of: a) selecting sample locations for each sample bin of an array of sample bins, b) storing the sample locations in a sample location memory, c) selecting one or more arrays of transformations that when applied to the array of sample bins generates a larger pattern of permuted arrays of sample bins, and d) tiling the larger pattern of permuted arrays of sample bins to span sample space. The sample location memory may store sample location displacements for an n×n array of bins, where n is a positive integer, a two-dimensional memory address may select one of the bins in the n×n array, and the first set of sample displacements may be accessed from the selected bin.

A method for re-generating sample locations for a sample bin that conform to the pre-selected pattern of permuted sample locations spanning sample space may include one or more of: a) receiving a two-dimensional bin address specifying a location of the sample bin, where the two-dimensional bin address includes an X bin address and a Y bin address, b) operating on a first portion of the two-dimensional bin address to identify a corresponding transformation from a pattern of transformations, where the first portion comprises a first set of bits in the X bin address and a first set of bits in the Y bin address, c) applying an inverse of the identified transformation to a second portion of the two-dimensional address to generate a two-dimensional memory address, where the second portion comprises a second set of bits in the X bin address and a second set of bits in the Y bin address, d) accessing a first set of sample displacements from a sample location memory using the two-dimensional memory address, e) applying the identified transformation to the first set of sample displacements to generate a second set of sample displacements, and f) adding the two-dimensional address of the sample bin to the second set of sample displacements to generate sample locations.

The first portion of the bin address is [Xb, Yb] and the second portion of the bin address is [Xa, Ya]; where the horizontal component X of the two-dimensional bin address is represented as X=[Xc,Xb,Xa]; where Xa is a contiguous set of least significant bits in X, Xb is a contiguous set of medium significant bits in X, and Xc is a contiguous set of next more significant bits in X; where sizes of Xa, Xb and Xc are "a" bits, "b" bits and "c" bits respectively; where the vertical component Y of the two-dimensional bin address is represented as Y=[Yc, Yb, Ya], where Ya is a contiguous set of least significant bits in Y, Yb is a contiguous set of medium significance bits in Y, and Yc is a contiguous set of next more significant bits in Y; and where sizes of Ya, Yb, and Yc are "a" bits, "b" bits, and "c" bits respectively, "a" and "b" are integers greater than or equal to one, and c is an integer greater than or equal to zero.

In some embodiments, the identified transformation may be equivalent to a product of a pre-selected set of two or more transformations. In these embodiments, the first portion [Xb, Yb] may contain bits to identify two or more transformations.

A method for rendering samples may include: a) receiving a two-dimensional bin address specifying a location of a bin in sample space that contains a portion of a polygon, b) identifying a transformation corresponding to the two-dimensional bin address from the pre-selected pattern of transformations that span sample space, c) identifying a specific sample bin from the array of sample bins that corresponds to the two-dimensional bin address, d) applying the identified transformation to the pre-selected sample displacements contained in the specific sample bin to output a permuted set of one or more sample displacements, e) adding the one or more sample displacements to the two-dimensional bin address to form one or more sample locations that may be located within the polygon, f) rendering parameter values for the one or more sample locations, g) discarding the sample locations, and h) storing the parameter values in a sample memory.

A method for filtering samples may include: a) reading a set of sample values corresponding to an array of sample bins from the sample memory, b) regenerating the sample locations used to render the set of samples, and c) filtering the sample values and sample locations into a set of pixel values.

In one set of embodiments, a user may be able to select no permutation. In this case the array of pre-selected sample locations may be tiled across sample space. In another set of embodiments, a time varying digital signal may be input to the sample generation circuit to alter the permutation.

In one alternative set of embodiments, the n×n tile may be replaced by an n1×n2 non-square tile of bins, where n1 and n2 are positive integers. The transformations to be used with a non-square tile may the subgroup of four transformations defined by (a) mirroring about x and (b) mirroring about y.

BRIEF DESCRIPTION OF THE DRAWINGS

A better understanding of the present invention can be obtained when the following detailed description is considered in conjunction with the following drawings, in which:

FIG. 23 illustrates the need for an inverse transformation; and

Figure 1:
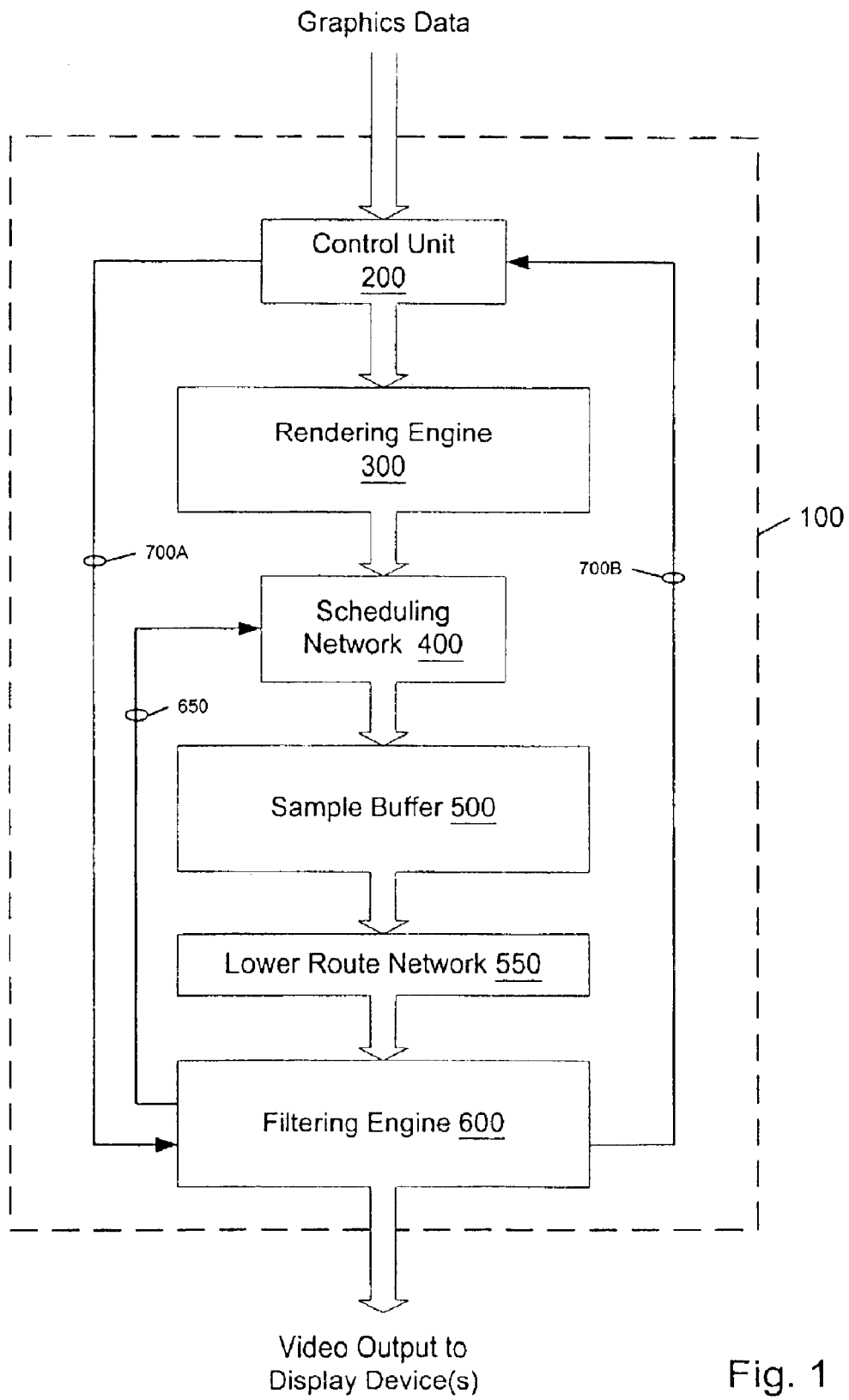
FIG. 1 illustrates one set of embodiments of a graphics accelerator configured to perform graphical computations.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must)." The term "include", and derivations thereof, mean "including, but not limited to". The term "connected" means "directly or indirectly connected", and the term "coupled" means "directly or indirectly connected".

DETAILED DESCRIPTION OF THE PREFERRED EMBODIMENTS

FIG. 1 illustrates one set of embodiments of a graphics accelerator 100 configured to perform graphics computations (especially 3D graphics computations). Graphics accelerator 100 may include a control unit 200, a rendering engine 300, a scheduling network 400, a sample buffer 500, a lower route network 550, and a filtering engine 600.

Figure 2:
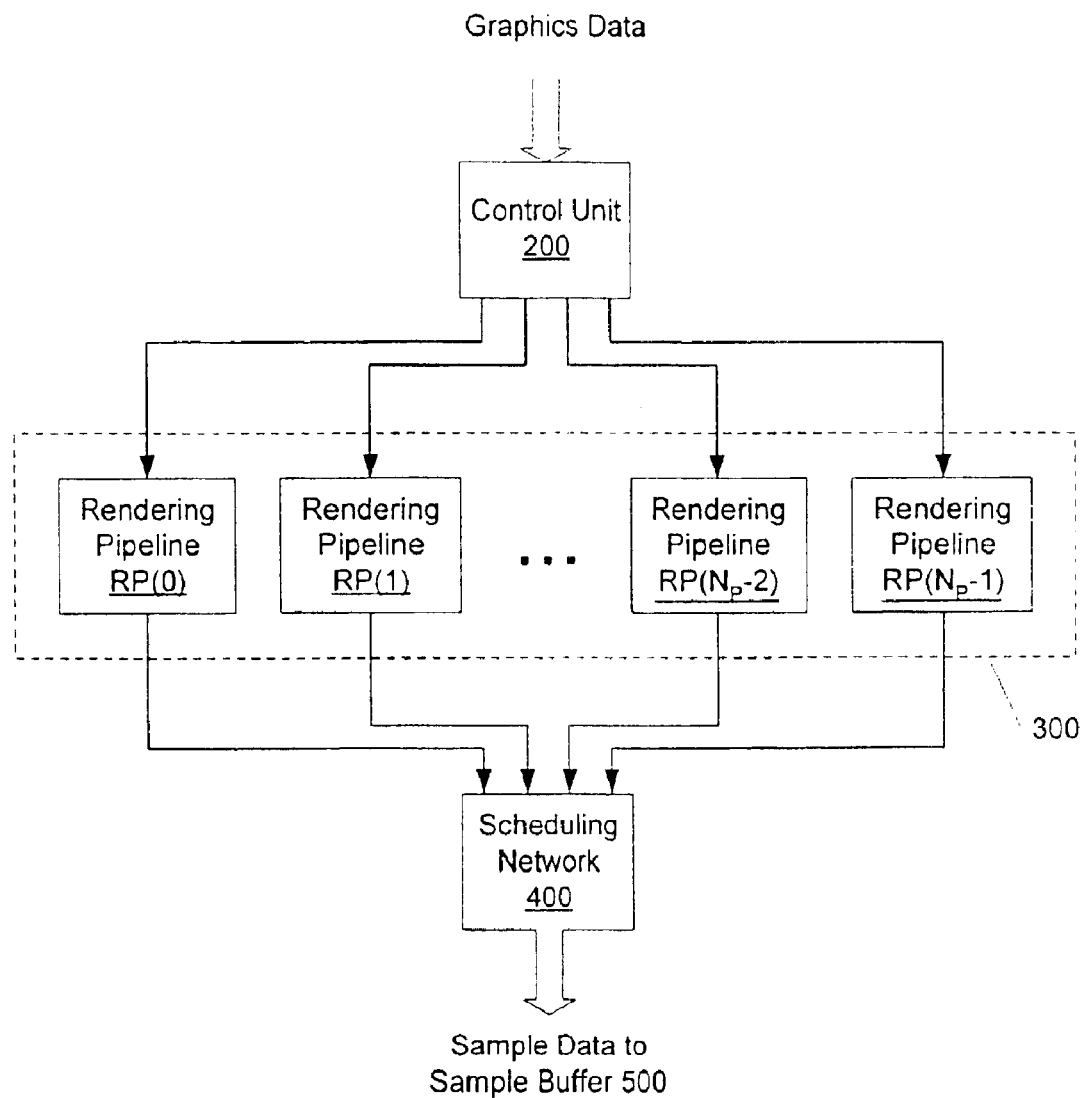
FIG. 2 illustrates one set of embodiments of a parallel rendering engine.

The rendering engine 300 may include a set of $N_{PL}$ rendering pipelines as suggested by FIG. 2, where $N_{PL}$ is a positive integer. The rendering pipelines, denoted as RP(0) through RP($N_{PL}$−1), are configured to operate in parallel. For example, in one embodiment, $N_{PL}$ equals four. In another embodiment, $N_{PL}$=8.

The control unit 200 receives a stream of graphics data from an external source (e.g. from the system memory of a host computer), and controls the distribution of the graphics data to the rendering pipelines. The control unit 200 may divide the graphics data stream into $N_{PL}$ substreams, which flow to the $N_{PL}$ rendering pipelines respectively. The control unit 200 may implement an automatic load-balancing scheme so the host application need not concern itself with load balancing among the multiple rendering pipelines.

The stream of graphics data received by the control unit 200 may correspond to a frame of a 3D animation. The frame may include a number of 3D objects. Each object may be described by a set of primitives such as polygons (e.g. triangles), lines, polylines, dots, etc. Thus, the graphics data stream may contain information defining a set of primitives.

Polygons are naturally described in terms of their vertices. Thus, the graphics data stream may include a stream of vertex instructions. A vertex instruction may specify a position vector (X,Y,Z) for a vertex. The vertex instruction may also include one or more of a color vector, a normal vector and a vector of texture coordinates. The vertex instructions may also include connectivity information, which allows the rendering engine 300 to assemble the vertices into polygons (e.g. triangles).

Each rendering pipeline RP(K) of the rendering engine 300 may receive a corresponding stream of graphics data from the control unit 200, and performs rendering computations on the primitives defined by the graphics data stream. The rendering computations generate samples, which are written into sample buffer 500 through the scheduling network 400.

The filtering engine 600 is configured to read samples from the sample buffer 500, to perform a filtering operation on the samples resulting in the generation of a video pixel stream, and, to convert the video pixel stream into an analog video signal. The analog video signal may be supplied to one or more video output ports for display on one or more display devices (such as computer monitors, projectors, head-mounted displays and televisions).

Furthermore, the graphics system 100 may be configured to generate up to ND independent video pixel streams denoted VPS(0), VPS(1), . . . , VPS($N_D$−1), where $N_D$ is a positive integer. Thus, a set of host applications (running on a host computer) may send $N_D$ graphics data streams denoted GDS(0), GDS(1), . . . , GDS($N_D$−1) to the graphics system 100. The rendering engine 300 may perform rendering computations on each graphics data stream GDS(I), for I=0, 1, 2, . . . , $N_D$−1, resulting in sample updates to a corresponding region SBR(I) of the sample buffer 500. The filtering engine 600 may operate on the samples from each sample buffer region SBR(I) to generate the corresponding video pixel stream VPS(I). The filtering engine 600 may convert each video pixel stream VPS(I) into a corresponding analog video signal AVS(I). The ND analog video signals may be supplied to a set of video output ports for display on a corresponding set of display devices. In one embodiment, $N_D$ equals two. In another embodiment, $N_D$ equals four.

The filtering engine 600 may send sample data requests to the scheduling network 400 through a request bus 650. In response to the sample data requests, scheduling network 400 may assert control signals, which invoke the transfer of the requested samples (or groups of samples) to the filtering engine 600.

In various embodiments, the sample buffer 500 includes a plurality of memory units, and the filtering engine 600 includes a plurality of filtering units. The filtering units interface may interface with the lower router network 550 to provide data select signals. The lower route network 550 may use the data select signals to steer data from the memory units to the filtering units.

The control unit 200 may couple to the filtering engine 600 through a communication bus 700, which includes an outgoing segment 700A and a return segment 700B. The outgoing segment 700A may be used to download parameters (e.g. lookup table values) to the filtering engine 600. The return segment 700B may be used as a readback path for the video pixels generated by filtering engine 600. Video pixels transferred to control unit 200 through the return segment 700B may be forwarded to system memory (i.e. the system memory of a host computer), or perhaps, to memory (e.g. texture memory) residing on graphics system 100 or on another graphics accelerator.

The control unit 200 may include direct memory access (DMA) circuitry. The DMA circuitry may be used to facilitate (a) the transfer of graphics data from system memory to the control unit 200, and/or, (b) the transfer of video pixels (received from the filtering engine 600 through the return segment 700B) to any of various destinations (such as the system memory of the host computer).

Figure 3:
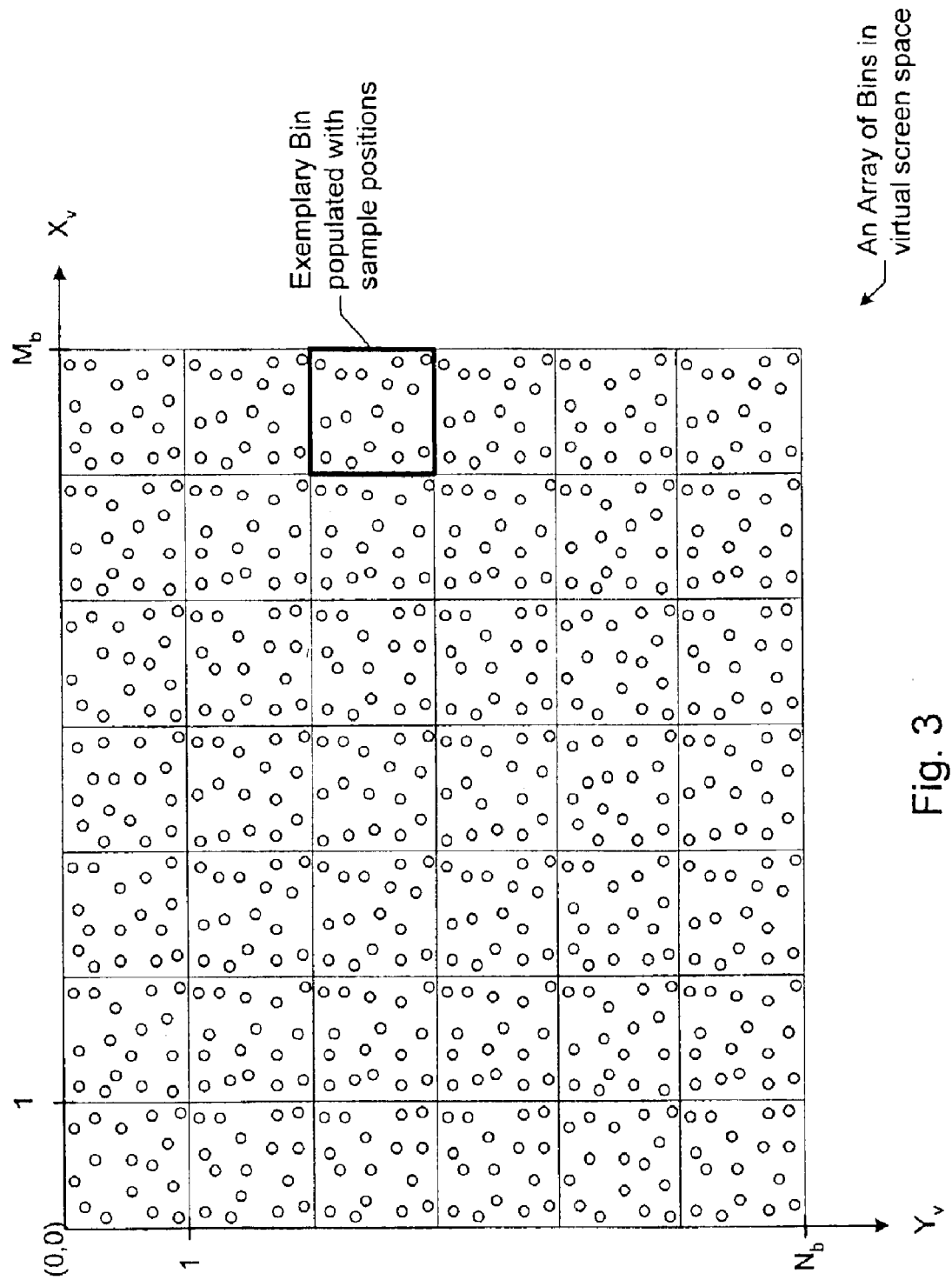
FIG. 3 illustrates an array of spatial bins each populated with a set of sample positions in a two-dimension virtual screen space.

The rendering pipelines of the rendering engine 300 may compute samples for the primitives defined by the received graphics data stream(s). The computation of samples may be organized according to an array of spatial bins as suggested by FIG. 3. The array of spatial bins defines a rectangular window in a virtual screen space. The spatial bin array may have dimension $M_B \times N_B$, i.e., may comprise $M_B$ bins horizontally and $N_B$ bins vertically.

Each spatial bin may be populated with a number of sample positions. Sample positions are denoted as small circles. Each sample position may be defined by a horizontal offset and a vertical offset with respect to the origin of the bin in which it resides. The origin of a bin may be at its top-left corner. Note that any of a variety of other positions on the boundary or in the interior of a bin may serve as its origin. A sample may be computed at each of the sample positions. A sample may include a color vector, and other values such as z depth and transparency (i.e. an alpha value).

The sample buffer 500 may organize the storage of samples according to memory bins. Each memory bin corresponds to one of the spatial bins, and stores the samples for the sample positions in a corresponding spatial bin.

If a rendering pipeline RP(k) determines that a spatial bin intersects with a given primitive (e.g. triangle), the rendering pipeline may:

(a) generate $N_{s/b}$ sample positions in the spatial bin;
(b) determine which of the $N_{s/b}$ sample positions reside interior to the primitive;
(c) compute a sample for each of the interior sample positions, and
(d) forward the computed samples to the scheduling network 400 for transfer to the sample buffer 500.

The computation of a sample at a given sample position may involve computing sample components such as red, green, blue, z, and alpha at the sample position. Each sample component may be computed based on a spatial interpolation of the corresponding components at the vertices of the primitive. For example, a sample's red component may be computed based on a spatial interpolation of the red components at the vertices of the primitive.

In addition, if the primitive is to be textured, one or more texture values may be computed for the intersecting bin. The final color components of a sample may be determined by combining the sample's interpolated color components and the one or more texture values.

Each rendering pipeline RP(K) may include dedicated circuitry for determining if a spatial bin intersects a given primitive, for performing steps (a), (b) and (c), for computing the one or more texture values, and for applying the one or more texture values to the samples.

Each rendering pipeline RP(K) may include programmable registers for the bin array size parameters $M_B$ and $N_B$ and the sample density parameter $N_{s/b}$. In one embodiment, $N_{s/b}$ may take values in the range from 1 to 16 inclusive.

Sample Rendering Methodology

Figure 4:
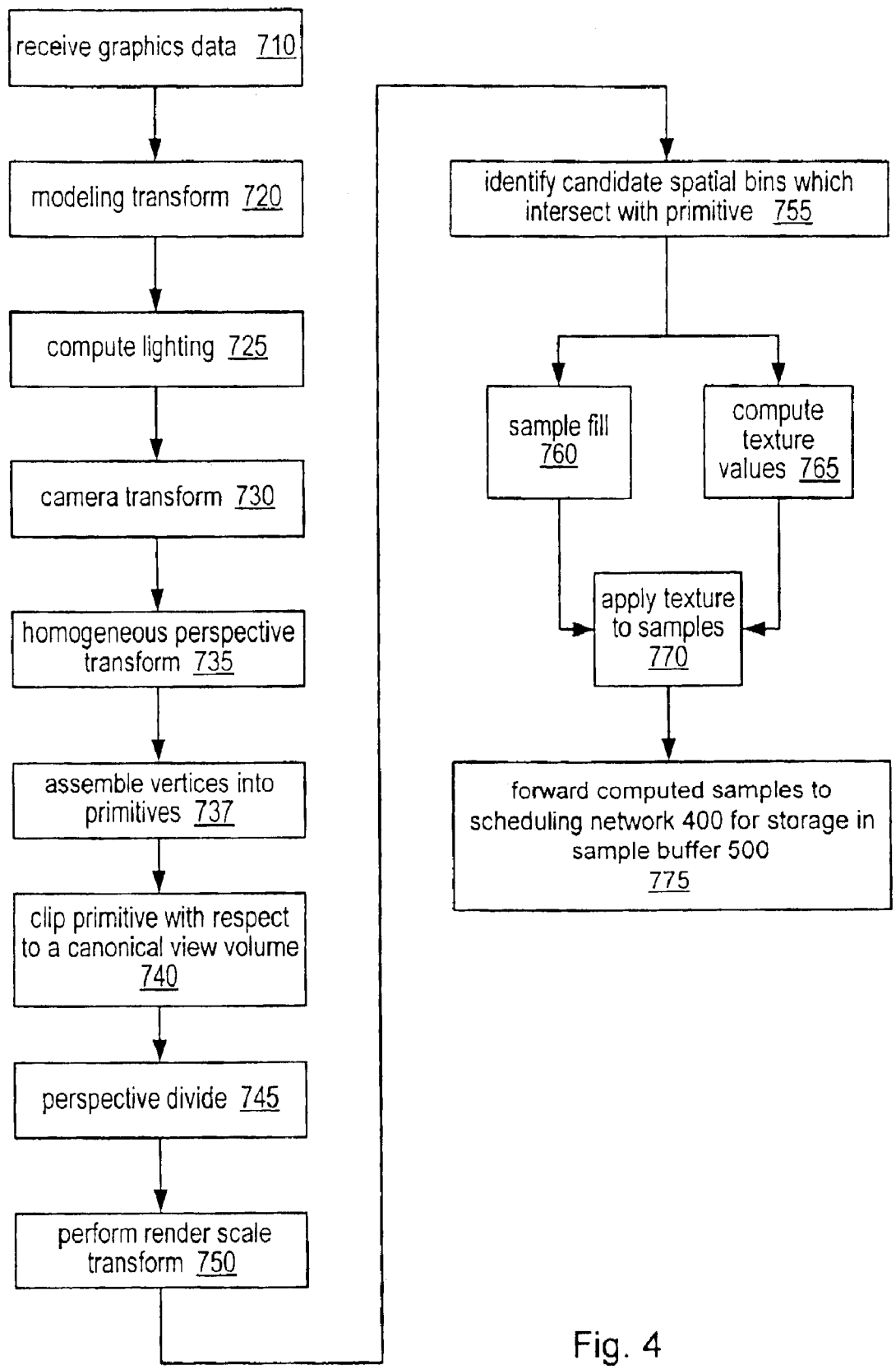
FIG. 4 illustrates one set of embodiments of a rendering methodology which may be used to generate samples in response to a received stream of graphics data.

FIG. 4 illustrates one set of embodiments of a rendering process implemented by each rendering pipeline RP(K) of the $N_{PL}$ rendering pipelines.

In step 710, rendering pipeline RP(K) receives a stream of graphics data from the control unit 200 (e.g. stores the graphics data in an input buffer).

The graphics data may have been compressed according to any of a variety of data compression and/or geometry compression techniques. Thus, the rendering pipeline RP(K) may decompress the graphics data to recover a stream of vertices.

In step 720, the rendering pipeline RP(K) may perform a modeling transformation on the stream of vertices. The modeling transformation serves to inject objects into a world coordinate system. The modeling transformation may also include the transformation of any normal vectors associated with the stream vertices. The matrix used to perform the modeling transformation is dynamically programmable by host software.

In step 725, rendering engine 300 may subject the stream vertices to a lighting computation. Lighting intensity values (e.g. color intensity values) may be computed for the vertices of polygonal primitives based on one or more of the following:

(1) the vertex normals;

(2) the position and orientation of a virtual camera in the world coordinate system;

(3) the intensity, position, orientation and type-classification of light sources; and (4) the material properties of the polygonal primitives such as their intrinsic color values, ambient, diffuse, and/or specular reflection coefficients.

The vertex normals (or changes in normals from one vertex to the next) may be provided as part of the graphics data stream. The rendering pipeline RP(K) may implement any of a wide variety of lighting models. The position and orientation of the virtual camera are dynamically adjustable. Furthermore, the intensity, position, orientation and type-classification of light sources are dynamically adjustable.

It is noted that separate virtual camera positions may be maintained for the viewer's left and right eyes in order to support stereo video. For example, rendering pipeline RP(K) may alternate between the left camera position and the right camera position from one animation frame to the next.

In step 730, the rendering pipeline RP(K) may perform a camera transformation on the vertices of the primitive. The camera transformation may be interpreted as providing the coordinates of the vertices with respect to a camera coordinate system, which is rigidly bound to the virtual camera in the world space. Thus, the camera transformation may require updating whenever the camera position and/or orientation change. The virtual camera position and/or orientation may be controlled by user actions such as manipulations of an input device (such as a joystick, data glove, mouse, light pen, and/or keyboard). In some embodiments, the virtual camera position and/or orientation may be controlled based on measurements of a user's head position and/or orientation and/or eye orientation(s).

In step 735, the rendering pipeline RP(K) may perform a homogenous perspective transformation to map primitives from the camera coordinate system into a clipping space, which is more convenient for a subsequent clipping computation. In some embodiments, steps 730 and 735 may be combined into a single transformation.

In step 737, rendering pipeline RP(K) may assemble the vertices to form primitives such as triangles, lines, etc.

In step 740, rendering pipeline RP(K) may perform a clipping computation on each primitive. In clipping space, the vertices of primitives may be represented as 4-tuples (X,Y,Z,W). In some embodiments, the clipping computation may be implemented by performing a series of inequality tests as follows:

$T1=(-W \leq X)$ $T2=(X \leq W)$ $T3=(-W \leq Y)$ $T4=(Y \leq W)$ $T5=(-W \leq Z)$ $T6=(Z \leq 0)$ If all the test flags are true, a vertex resides inside the canonical view volume. If any of the test flags are false, the vertex is outside the canonical view volume. An edge between vertices A and B is inside the canonical view volume if both vertices are inside the canonical view volume. An edge can be trivially rejected if the expression Tk(A) OR Tk(B) is false for any k in the range from one to six. Otherwise, the edge requires testing to determine if it partially intersects the canonical view volume, and if so, to determine the points of intersection of the edge with the clipping planes. A primitive may thus be cut down to one or more interior sub-primitives (i.e. subprimitives that lie inside the canonical view volume). The rendering pipeline RP(K) may compute color intensity values for the new vertices generated by clipping.

Note that the example given above for performing the clipping computation is not meant to be limiting. Other methods may be used for performing the clipping computation.

In step 745, rendering pipeline RP(K) may perform a perspective divide computation on the homogenous post-clipping vertices (X,Y,Z,W) according to the relations $x=X/W$ $y=Y/W$ $z=Z/W.$ After the perspective divide, the x and y coordinates of each vertex (x,y,z) may reside in a viewport rectangle, for example, a viewport square defined by the inequalities $-1 \leq x \leq 1$ and $-1 \leq y \leq 1$.

In step 750, the rendering pipeline RP(K) may perform a render scale transformation on the post-clipping primitives. The render scale transformation may operate on the x and y coordinates of vertices, and may have the effect of mapping the viewport square in perspective-divided space onto (or into) the spatial bin array in virtual screen space, i.e., onto (or into) a rectangle whose width equals the array horizontal bin resolution $M_B$ and whose height equals the array vertical bin resolution $N_B$. Let $X_v$ and $Y_v$ denote the horizontal and vertical coordinate respectively in the virtual screen space.

Figure 5:
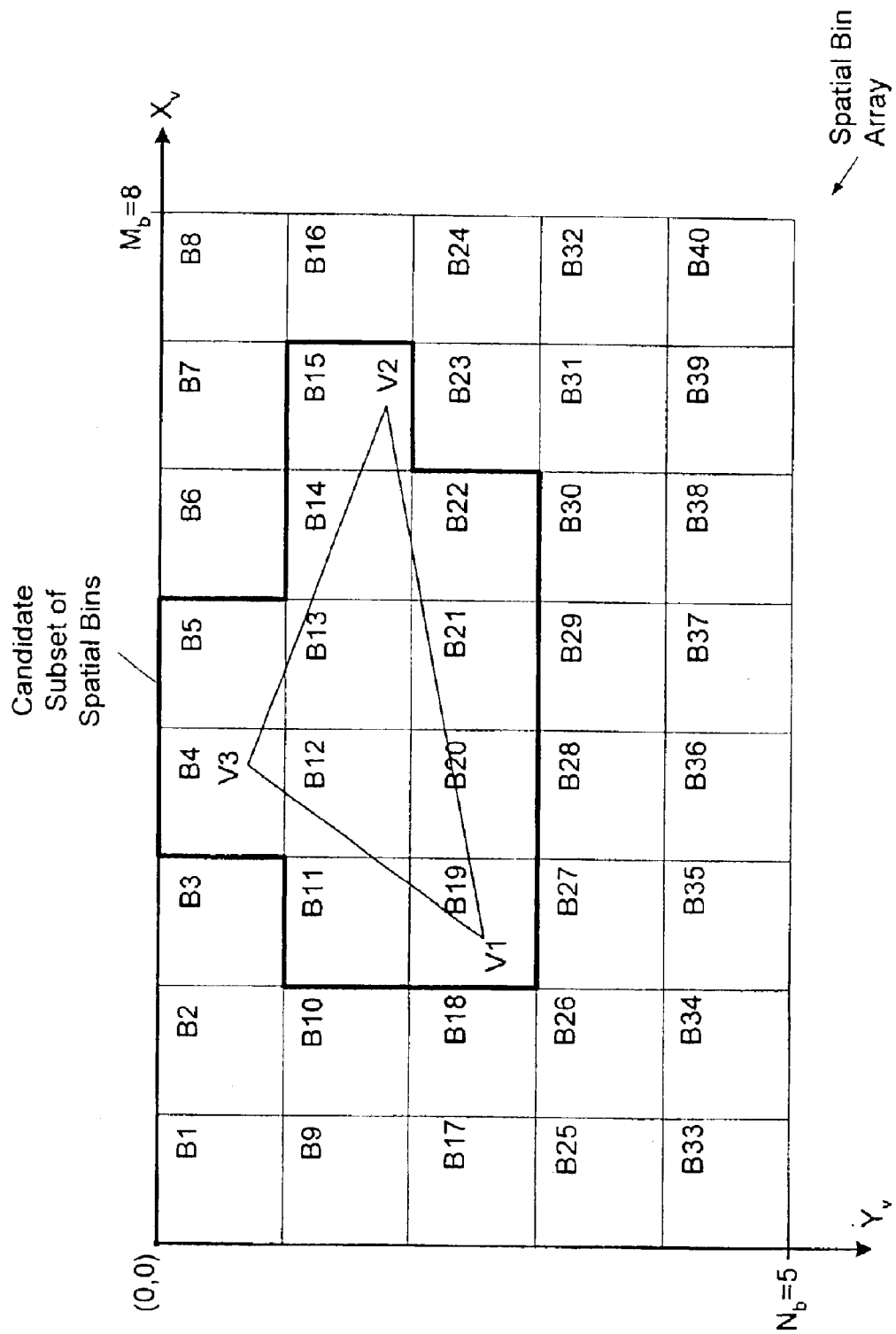
FIG. 5 illustrates a set of candidate bins which intersect a particular triangle.

In step 755, the rendering pipeline RP(K) may identify spatial bins which geometrically intersect with the post-scaling primitive as suggested by FIG. 5. Bins in this subset are referred to as "candidate" bins or "intersecting" bins. It is noted that values $M_B=8$ and $N_B=5$ for the dimensions of the spatial bin array have been chosen for sake of illustration, and are much smaller than would typically be used in most applications of graphics system 100.

Figure 6:
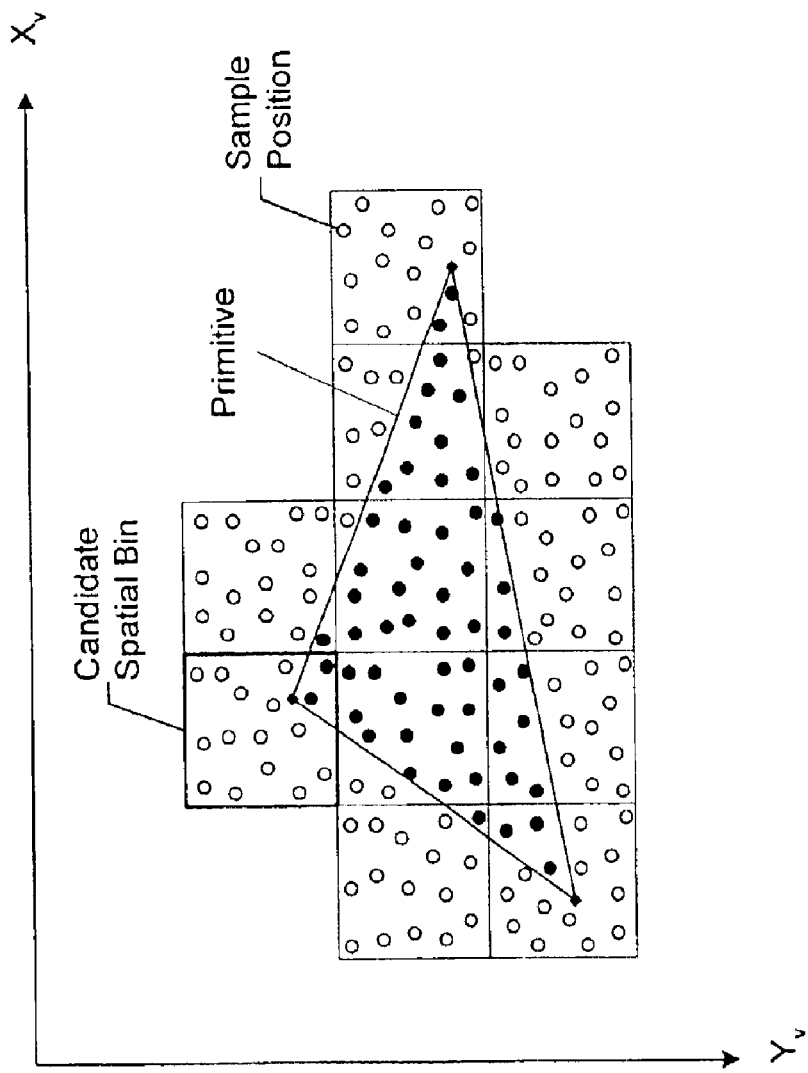
FIG. 6 illustrates the identification of sample positions in the candidate bins which fall interior to the triangle.

In step 760, the rendering pipeline RP(K) performs a "sample fill" operation on candidate bins identified in step 755 as suggested by FIG. 6. In the sample fill operation, the rendering pipeline RP(K) populates candidate bins with sample positions, identifies which of the sample positions reside interior to the primitive, and computes sample values (such as red, green, blue, z and alpha) at each of the interior sample positions. The rendering pipeline RP(K) may include a plurality of sample fill units to parallelize the sample fill computation. For example, two sample fill units may perform the sample fill operation in parallel on two candidate bins respectively. (This N=2 example generalizes to any number of parallel sample fill units). In FIG. 6, interior sample positions are denoted as small black dots, and exterior sample positions are denoted as small circles.

Figure 7:
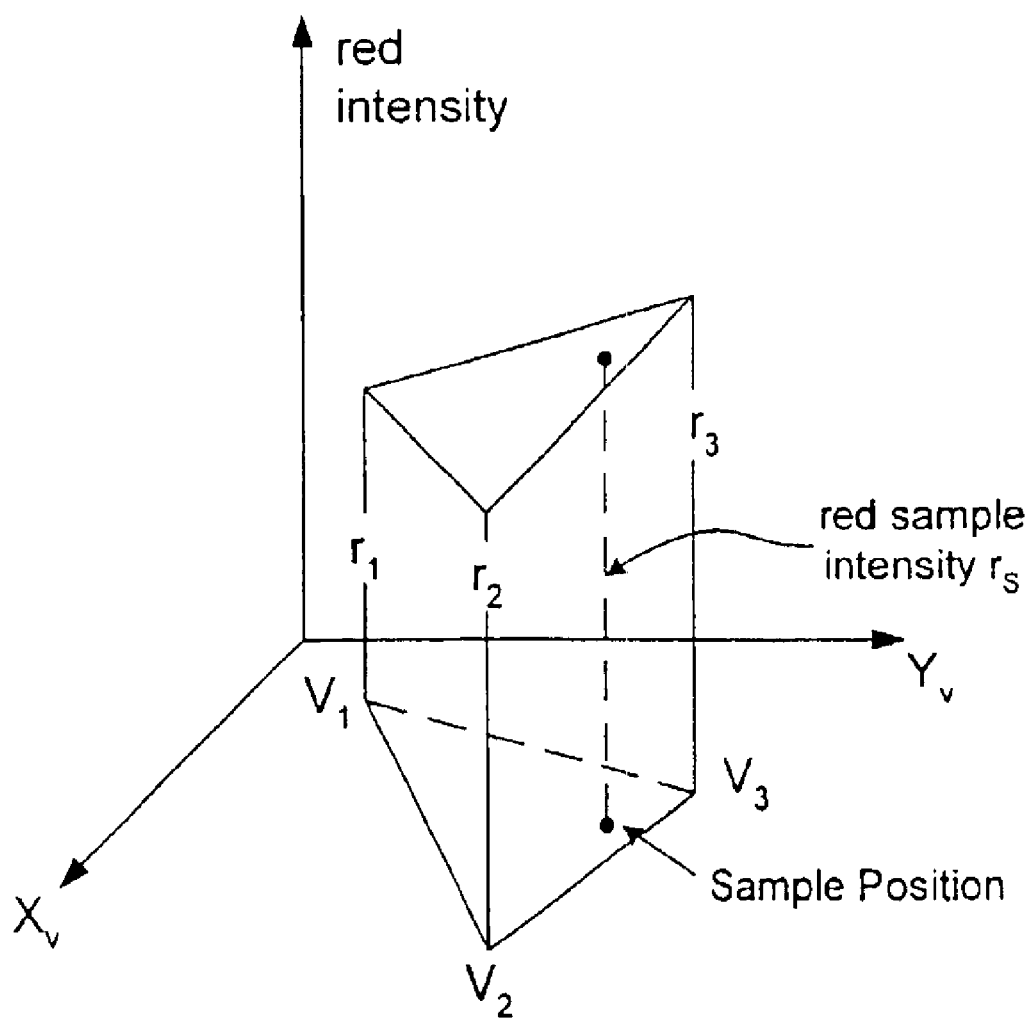
FIG. 7 illustrates the computation of a red sample component based on a spatial interpolation of the red components at the vertices of the containing triangle.

The rendering pipeline RP(K) may compute the color components (r,g,b) for each interior sample position in a candidate bin based on a spatial interpolation of the corresponding vertex color components as suggested by FIG. 7. FIG. 7 suggests a linear interpolation of a red intensity value $r_S$ for a sample position inside the triangle defined by the vertices V1, V2, and V3 in virtual screen space (i.e. the horizontal plane of the figure). The red color intensity is shown as the up-down coordinate. Each vertex Vk has a corresponding red intensity value $r_k$. Similar interpolations may be performed to determine green, blue, z and alpha values.

In step 765, rendering pipeline RP(K) may compute a vector of texture values for each candidate bin. The rendering pipeline RP(K) may couple to a corresponding texture memory TM(K). The texture memory TM(K) may be used to store one or more layers of texture information. Rendering pipeline RP(K) may use texture coordinates associated with a candidate bin to read texels from the texture memory TM(K). The texels may be filtered to generate the vector of texture values. The rendering pipeline RP(K) may include a plurality of texture filtering units to parallelize the computation of texture values for one or more candidate bins.

The rendering pipeline RP(K) may include a sample fill pipeline which implements step 760 and a texture pipeline which implements step 765. The sample fill pipeline and the texture pipeline may be configured for parallel operation. The sample fill pipeline may perform the sample fill operations on one or more candidate bins while the texture fill pipeline computes the texture values for the one or more candidate bins.

In step 770, the rendering pipeline RP(K) may apply the one or more texture values corresponding to each candidate bin to the color vectors of the interior samples in the candidate bin. Any of a variety of methods may be used to apply the texture values to the sample color vectors.

In step 775, the rendering pipeline RP(K) may forward the computed samples to the scheduling network 400 for storage in the sample buffer 500.

The sample buffer 500 may be configured to support double-buffered operation. The sample buffer may be logically partitioned into two buffer segments A and B. The rendering engine 300 may write into buffer segment A while the filtering engine 600 reads from buffer segment B. At the end of a frame of animation, a host application (running on a host computer) may assert a buffer swap command. In response to the buffer swap command, control of buffer segment A may be transferred to the filtering engine 600, and control of buffer segment B may be transferred to rendering engine 300. Thus, the rendering engine 300 may start writing samples into buffer segment B, and the filtering engine 600 may start reading samples from buffer segment A.

It is noted that usage of the term "double-buffered" does not necessarily imply that all components of samples are double-buffered in the sample buffer 500. For example, sample color may be double-buffered while other components such as z depth may be single-buffered.

In some embodiments, the sample buffer 500 may be triple-buffered or N-fold buffered, where N is greater than two.

Filtration of Samples to Determine Pixels

Filtering engine 600 may access samples from a buffer segment (A or B) of the sample buffer 500, and generate video pixels from the samples. Each buffer segment of sample buffer 500 may be configured to store an $M_B \times N_B$ array of bins. Each bin may store $N_{s/b}$ samples. The values $M_B$, $N_B$ and $N_{s/b}$ are programmable parameters.

Figure 8:
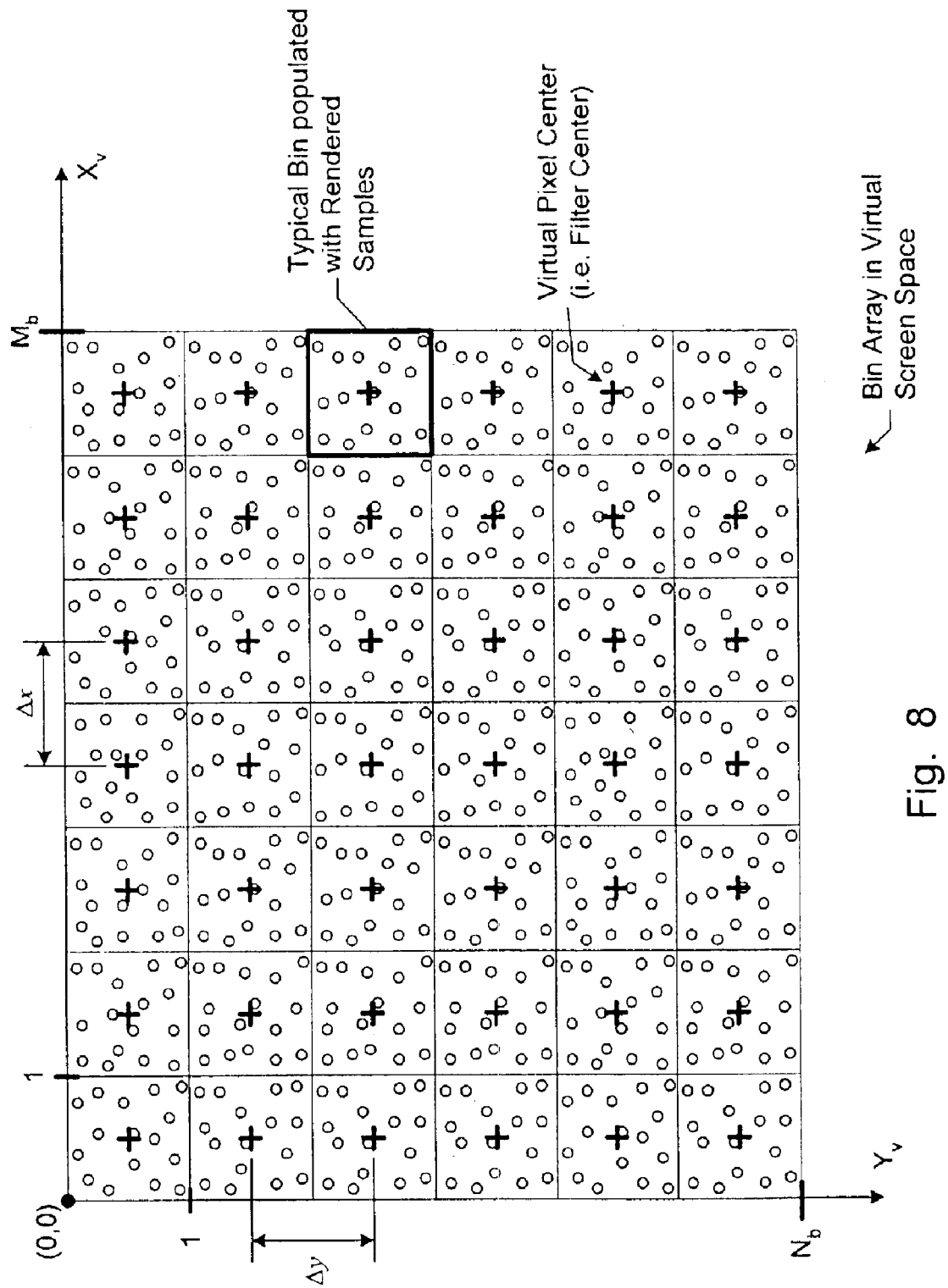
FIG. 8 illustrates an array of virtual pixel positions distributed in the virtual screen space and superimposed on top of the array of spatial bins.

As suggested by FIG. 8, filtering engine 600 may scan through virtual screen space in raster fashion generating virtual pixel positions denoted by the small plus markers, and generating a video pixel at each of the virtual pixel positions based on the samples (small circles) in the neighborhood of the virtual pixel position. The virtual pixel positions are also referred to herein as filter centers (or kernel centers) since the video pixels are computed by means of a filtering of samples. The virtual pixel positions form an array with horizontal displacement $\Delta X$ between successive virtual pixel positions in a row and vertical displacement $\Delta Y$ between successive rows. The first virtual pixel position in the first row is controlled by a start position ($X_{start}$, $Y_{start}$). The horizontal displacement $\Delta X$, vertical displacement $\Delta Y$ and the start coordinates $X_{start}$ and $Y_{start}$ are programmable parameters.

FIG. 8 illustrates a virtual pixel position at the center of each bin. However, this arrangement of the virtual pixel positions (at the centers of render pixels) is a special case. More generally, the horizontal displacement $\Delta x$ and vertical displacement $\Delta y$ may be assigned values greater than or less than one. Furthermore, the start position ($X_{start}$, $Y_{start}$) is not constrained to lie at the center of a spatial bin. Thus, the vertical resolution $N_P$ of the array of virtual pixel centers may be different from $N_B$, and the horizontal resolution $M_P$ of the array of virtual pixel centers may be different from $M_B$.

Figure 9:
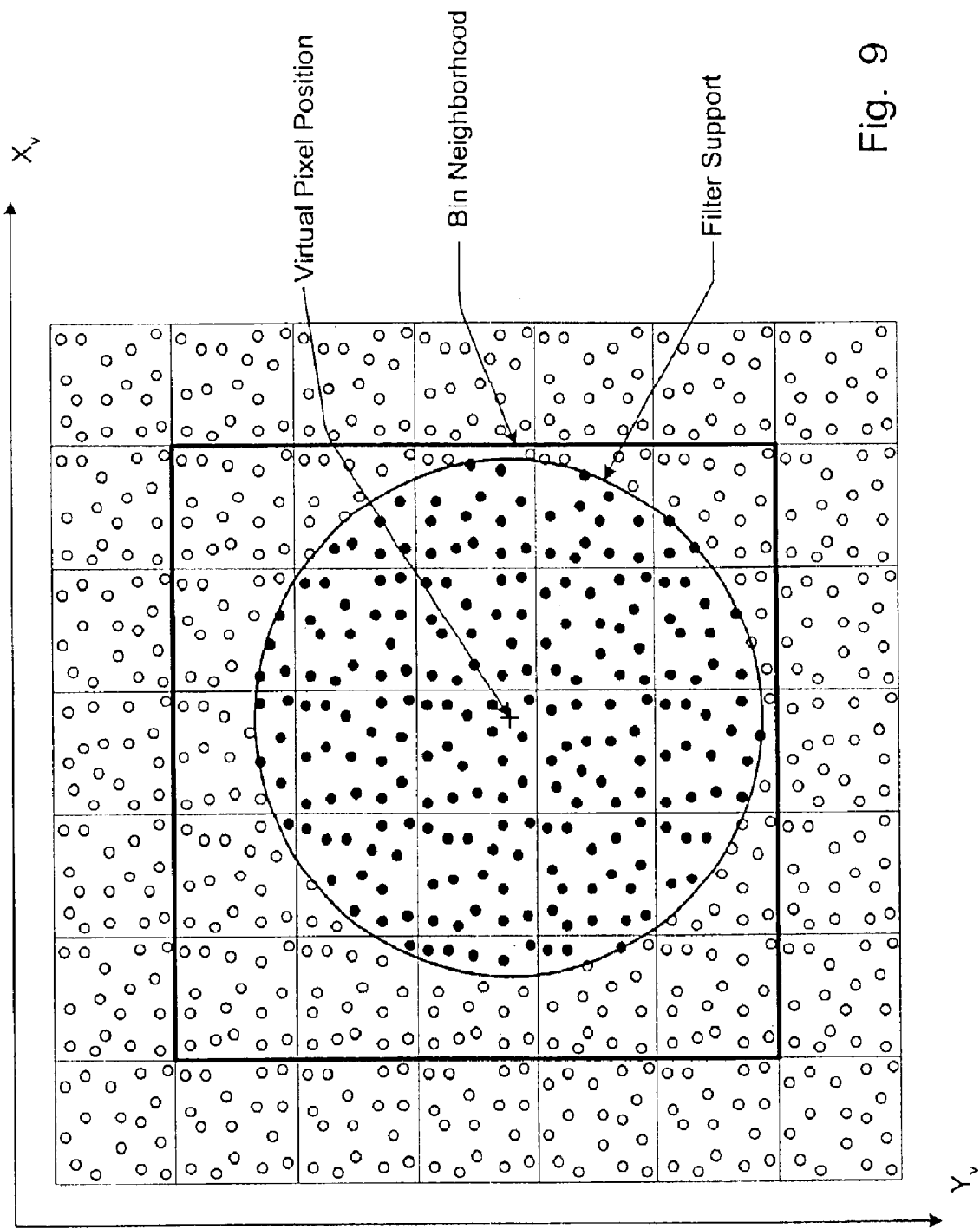
FIG. 9 illustrates the computation of a pixel at a virtual pixel position (denoted by the plus marker) according to one set of embodiments.

The filtering engine 600 may compute a video pixel at a particular virtual pixel position as suggested by FIG. 9. The filtering engine 600 may compute the video pixel based on a filtration of the samples falling within a support region centered on (or defined by) the virtual pixel position. Each sample S falling within the support region may be assigned a filter coefficient $C_S$ based on the sample's position (or some function of the sample's radial distance) with respect to the virtual pixel position.

Each of the color components of the video pixel may be determined by computing a weighted sum of the corresponding sample color components for the samples falling inside the filter support region. For example, the filtering engine 600 may compute an initial red value $r_P$ for the video pixel P according to the expression $$r_P = \Sigma C_S r_S,$$

where the summation ranges over each sample S in the filter support region, and where $r_S$ is the red sample value of the sample S. In other words, the filtering engine 600 may multiply the red component of each sample S in the filter support region by the corresponding filter coefficient $C_S$, and add up the products. Similar weighted summations may be performed to determine an initial green value $g_P$, an initial blue value $b_P$, and optionally, an initial alpha value $\alpha_P$ for the video pixel P based on the corresponding components of the samples.

Furthermore, the filtering engine 600 may compute a normalization value E by adding up the filter coefficients $C_S$ for the samples S in the bin neighborhood, i.e., $$E = \Sigma C_S.$$

The initial pixel values may then be multiplied by the reciprocal of E (or equivalently, divided by E) to determine normalized pixel values:

$$R_P = (1/E) * r_P$$

$$G_P = (1/E) * g_P$$

$B_P = (1/E) * b_P$ $A_P = (1/E) * a_P$.

In one set of embodiments, the filter coefficient $C_S$ for each sample S in the filter support region may be determined by a table lookup. For example, a radially symmetric filter may be realized by a filter coefficient table, which is addressed by a function of a sample's radial distance with respect to the virtual pixel center. The filter support for a radially symmetric filter may be a circular disk as suggested by the example of FIG. 9. The support of a filter is the region in virtual screen space on which the filter is defined. The terms "filter" and "kernel" are used as synonyms herein. Let $R_f$ denote the radius of the circular support disk.

The filtering engine 600 may examine each sample S in a neighborhood of bins containing the filter support region. The bin neighborhood may be a rectangle (or square) of bins. For example, in one embodiment the bin neighborhood is a 5×5 array of bins centered on the bin which contains the virtual pixel position.

The filtering engine 600 may compute the square radius $(D_S)^2$ of each sample position $(X_S, Y_S)$ in the bin neighborhood with respect to the virtual pixel position $(X_P, Y_P)$ according to the expression $$(D_S)^2 = (X_S - X_P)^2 + (Y_S - Y_P)^2.$$

The square radius $(D_S)^2$ may be compared to the square radius $(R_f)^2$ of the filter support. If the sample's square radius is less than (or, in a different embodiment, less than or equal to) the filter's square radius, the sample S may be marked as being valid (i.e. inside the filter support). Otherwise, the sample S may be marked as invalid.

The filtering engine 600 may compute a normalized square radius $U_S$ for each valid sample S by multiplying the sample's square radius by the reciprocal of the filter's square radius:

$$U_S = (D_S)^2 \frac{1}{(R_f)^2}.$$

The normalized square radius $U_S$ may be used to access the filter coefficient table for the filter coefficient $C_S$. The filter coefficient table may store filter weights indexed by the normalized square radius.

In various embodiments, the filter coefficient table is implemented in RAM and is programmable by host software. Thus, the filter function (i.e. the filter kernel) used in the filtering process may be changed as needed or desired. Similarly, the square radius $(R_f)^2$ of the filter support and the reciprocal square radius $1/(R_f)^2$ of the filter support may be programmable.

Because the entries in the filter coefficient table are indexed according to normalized square distance, they need not be updated when the radius $R_f$ of the filter support changes. The filter coefficients and the filter radius may be modified independently.

In one embodiment, the filter coefficient table may be addressed with the sample radius $D_S$ at the expense of computing a square root of the square radius $(D_S)^2$. In another embodiment, the square radius may be converted into a floating-point format, and the floating-point square radius may be used to address the filter coefficient table. It is noted that the filter coefficient table may be indexed by any of various radial distance measures. For example, an $L^1$ norm or $L_{infinity}$ norm may be used to measure the distance between a sample position and the virtual pixel center.

Invalid samples may be assigned the value zero for their filter coefficients. Thus, the invalid samples end up making a null contribution to the pixel value summations. In other embodiments, filtering hardware internal to the filtering engine may be configured to ignore invalid samples. Thus, in these embodiments, it is not necessary to assign filter coefficients to the invalid samples.

In some embodiments, the filtering engine 600 may support multiple filtering modes. For example, in one collection of embodiments, the filtering engine 600 supports a box filtering mode as well as a radially symmetric filtering mode. In the box filtering mode, filtering engine 600 may implement a box filter over a rectangular support region, e.g., a square support region with radius $R_f$ (i.e. side length $2R_f$). Thus, the filtering engine 600 may compute boundary coordinates for the support square according to the expressions $X_P + R_f$, $X_P - R_f$, $Y_P + R_f$, and $Y_P - R_f$. Each sample S in the bin neighborhood may be marked as being valid if the sample's position $(X_S, Y_S)$ falls within the support square, i.e., if $X_P - R_f < X_S < X_P + R_f$ and $Y_P - R_f < Y_S < Y_P + R_f$.

Otherwise the sample S may be marked as invalid. Each valid sample may be assigned the same filter weight value (e.g., $C_S = 1$). It is noted that any or all of the strict inequalities (<) in the system above may be replaced with permissive inequalities ($\leq$). Various embodiments along these lines are contemplated.

The filtering engine 600 may use any of a variety of filters either alone or in combination to compute pixel values from sample values. For example, the filtering engine 600 may use a box filter, a tent filter, a cone filter, a cylinder filter, a Gaussian filter, a Catmull-Rom filter, a Mitchell-Netravali filter, a windowed sinc filter, or in general, any form of band pass filter or any of various approximations to the sinc filter.

In one set of embodiments, the filtering engine 600 may include a set of filtering units FU(0), FU(1), FU(2), ..., FU($N_f - 1$) operating in parallel, where the number $N_f$ of filtering units is a positive integer. For example, in one embodiment, $N_f = 4$. In another embodiment, $N_f = 8$.

The filtering units may be configured to partition the effort of generating each frame (or field of video). A frame of video may comprise an $M_P \times N_P$ array of pixels, where $M_P$ denotes the number of pixels per line, and $N_P$ denotes the number of lines. Each filtering unit FU(K) may be configured to generate a corresponding subset of the pixels in the $M_P \times N_P$ pixel array. For example, in the $N_f = 4$ case, the pixel array may be partitioned into four vertical stripes, and each filtering unit FU(K), K=0, 1, 2, 3, may be configured to generate the pixels of the corresponding stripe.

Filtering unit FU(K) may include a system of digital circuits, which implement the processing loop suggested below. The values $X_{start}(K)$ and $Y_{start}(K)$ represent the start position for the first (e.g. top-left) virtual pixel center in the $K^{th}$ stripe of virtual pixel centers. The values $\Delta X(K)$ and $\Delta Y(K)$ represent respectively the horizontal and vertical step size between virtual pixel centers in the $K^{th}$ stripe. The value $M_H(K)$ represents the number of pixels horizontally in the $K^{th}$ stripe. For example, if there are four stripes ($N_f = 4$) with equal width, $M_H(K)$ may be set equal to $M_P/4$ for K=0, 1, 2, 3. Filtering unit FU(K) may generate a stripe of pixels in a scan line fashion as follows:

```
I=0;
J=0;
X_P=X_start(K);
Y_P=Y_start(K);
while (J<N_P) {
    while (I<M_H(K) {
        PixelValues = Filtration(X_P,Y_P);
        Send PixelValues to Output Buffer;
        X_P = X_P+ΔX(K);
        I = I + 1;
    }
    X_P=X_start(K)
    Y_P=Y_P+ΔY(K);
    J=J+1;
}
```

The expression Filtration($X_P$, $Y_P$) represents the filtration of samples in the filter support region of the current virtual pixel position ($X_P$, $Y_P$) to determine the components (e.g. RGB values, and optionally, an alpha value) of the current pixel as described above. Once computed, the pixel values may be sent to an output buffer for merging into a video stream. The inner loop generates successive virtual pixel positions within a single row of the stripe. The outer loop generates successive rows. The above fragment may be executed once per video frame (or field). Filtering unit FU(K) may include registers for programming the values $X_{start}(K)$, $Y_{start}(K)$, $\Delta X(K)$, $\Delta Y(K)$, and $M_H(K)$. These values are dynamically adjustable from host software. Thus, the graphics system 100 may be configured to support arbitrary video formats.

Figure 10:
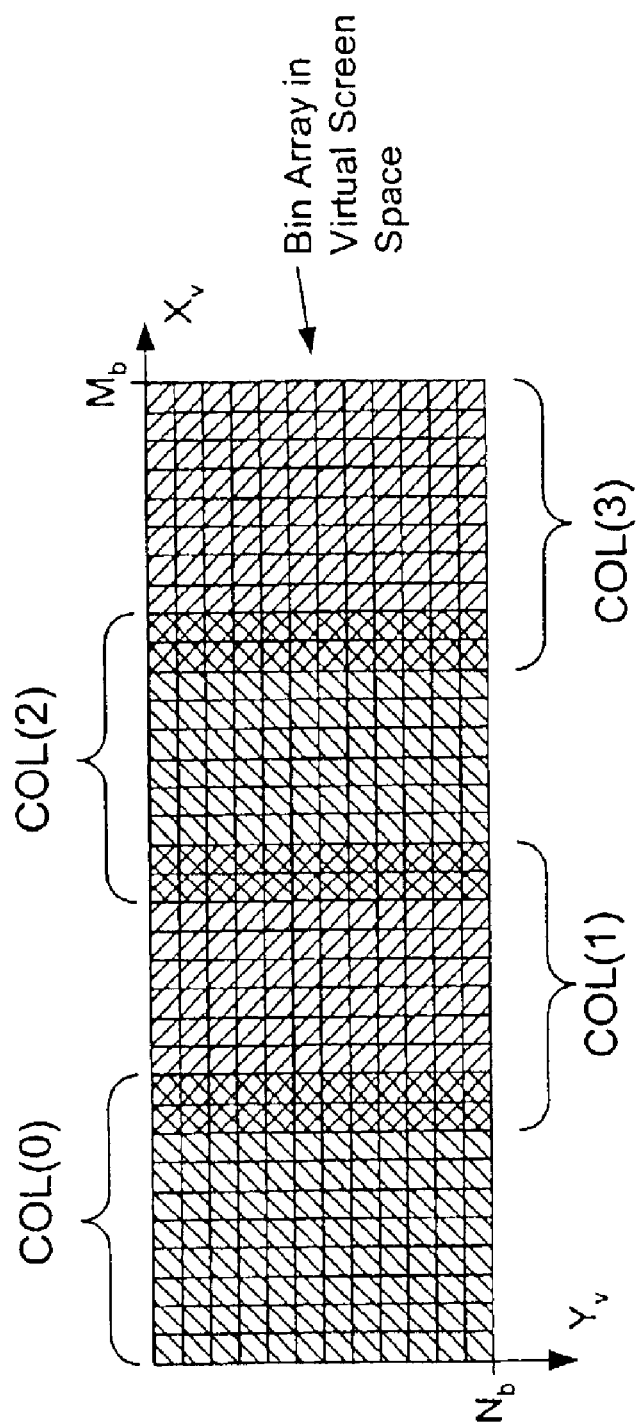
FIG. 10 illustrates a set of columns in the spatial bin array, wherein the $K^{th}$ column defines the subset of memory bins (from the sample buffer) which are used by a corresponding filtering unit FU(K) of the filtering engine.

Each filtering unit FU(K) accesses a corresponding subset of bins from the sample buffer 500 to generate the pixels of the $K^{th}$ stripe. For example, each filtering unit FU(K) may access bins corresponding to a column COL(K) of the bin array in virtual screen space as suggested by FIG. 10. Each column may be a rectangular subarray of bins. Note that column COL(K) may overlap with adjacent columns. This is a result of using a filter function with filter support that covers more than one spatial bin. Thus, the amount of overlap between adjacent columns may depend on the radius of the filter support.

Figure 11:
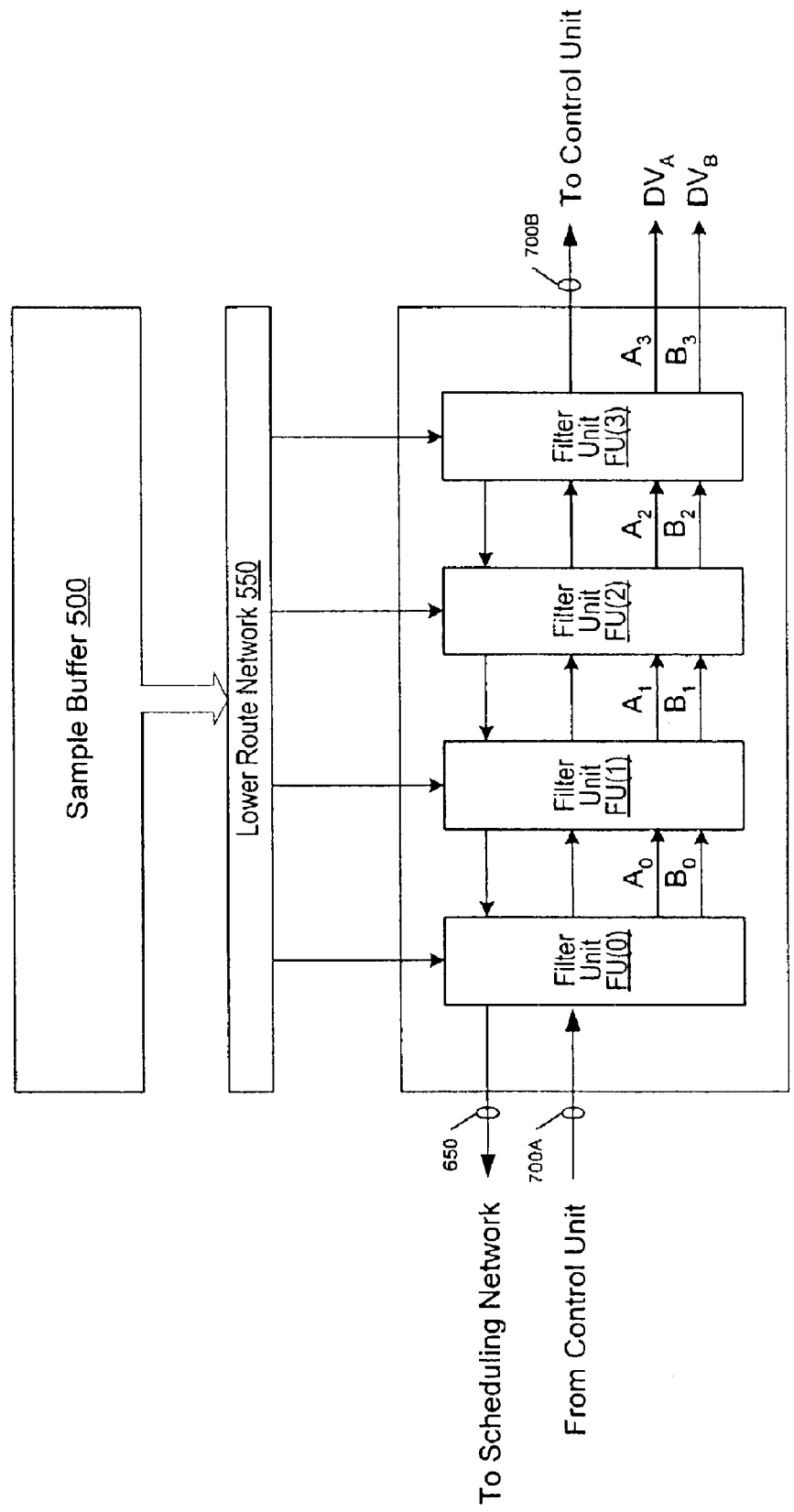
FIG. 11 illustrates one set of embodiments of filtering engine 600.

The filtering units may be coupled together in a linear succession as suggested by FIG. 11 in the case $N_f$=4. Except for the first filtering unit FU(0) and the last filtering unit FU($N_f$-1), each filtering unit FU(K) may be configured to receive digital video input streams $A_{K-1}$ and $B_{K-1}$ from a previous filtering unit FU(K-1), and to transmit digital video output streams $A_K$ and $B_K$ to the next filtering unit FU(K+1). The first filtering unit FU(0) generates video streams $A_0$ and $B_0$ and transmits these streams to filtering unit FU(1). The last filtering unit FU($N_f$-1) receives digital video streams $A_{Nf-2}$ and $B_{Nf-2}$ from the previous filtering unit FU($N_f$-2), and generates digital video output streams $A_{Nf-1}$ and $B_{Nf-1}$ also referred to as video streams $DV_A$ and $DV_B$ respectively. Video streams $A_0, A_1, \ldots, A_{Nf-1}$ are said to belong to video stream A. Similarly, video streams $B_0, B_1, \ldots, B_{Nf-1}$ are said to belong to video stream B.

Each filtering unit FU(K) may be programmed to mix (or substitute) its computed pixel values into either video stream A or video stream B. For example, if the filtering unit FU(K) is assigned to video stream A, the filtering unit FU(K) may mix (or substitute) its computed pixel values into video stream A, and pass video stream B unmodified to the next filtering unit FU(K+1). In other words, the filtering unit FU(K) may mix (or replace) at least a subset of the dummy pixel values present in video stream $A_{K-1}$ with its locally computed pixel values. The resultant video stream AK is transmitted to the next filtering unit. The first filtering unit FU(0) may generate video streams $A_{-1}$, and $B_{-1}$ containing dummy pixels (e.g., pixels having a background color), and mix (or substitute) its computed pixel values into either video stream $A_{-1}$, or $B_{-1}$, and pass the resulting streams $A_0$ and $B_0$ to the filtering unit FU(1). Thus, the video streams A and B mature into complete video signals as they are operated on by the linear succession of filtering units.

The filtering unit FU(K) may also be configured with one or more of the following features: color look-up using pseudo color tables, direct color, inverse gamma correction, and conversion of pixels to non-linear light space. Other features may include programmable video timing generators, programmable pixel clock synthesizers, cursor generators, and crossbar functions.

While much of the present discussion has focused on the case where $N_f$=4, it is noted that the inventive principles described in this special case naturally generalize to arbitrary values for the parameter $N_f$ (the number of filtering units).

Figure 12:
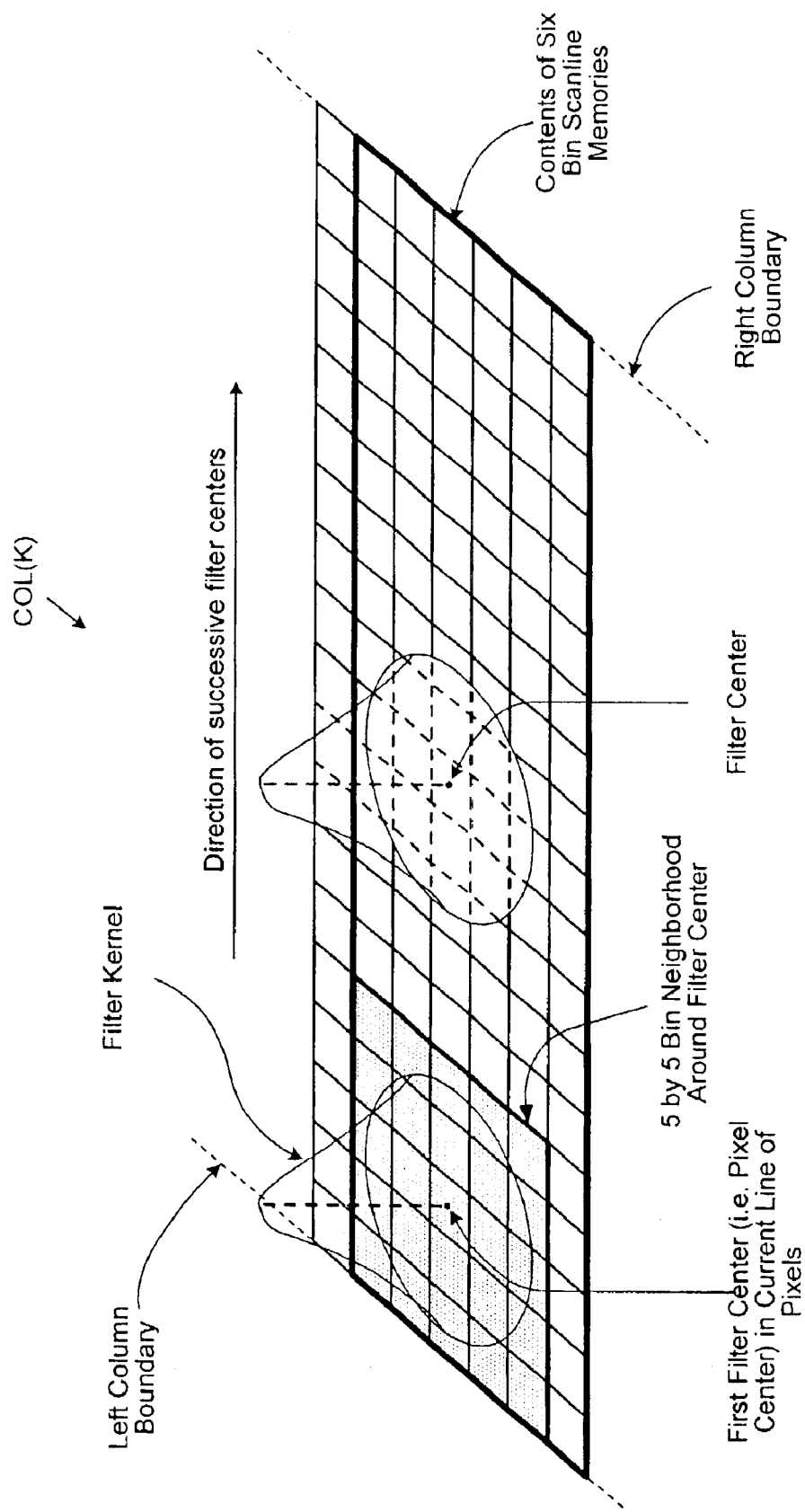
FIG. 12 illustrates one embodiment of a computation of pixels at successive filter centers (i.e. virtual pixel centers) across a bin column.

In one set of embodiments, each filtering unit FU(K) may include (or couple to) a plurality of bin scanline memories (BSMs). Each bin scanline memory may contain sufficient capacity to store a horizontal line of bins within the corresponding column COL(K). For example, in some embodiments, filtering unit FU(K) may include six bin scanline memories as suggested by FIG. 12.

Filtering unit FU(K) may move the filter centers through the column COL(K) in a raster fashion, and generate a pixel at each filter center. The bin scanline memories may be used to provide fast access to the memory bins used for a line of pixel centers. As the filtering unit FU(K) may use samples in a 5 by 5 neighborhood of bins around a pixel center to compute a pixel, successive pixels in a line of pixels end up using a horizontal band of bins that spans the column and measures five bins vertically. Five of the bin scan lines memories may store the bins of the current horizontal band. The sixth bin scan line memory may store the next line of bins, after the current band of five, so that the filtering unit FU(K) may immediately begin computation of pixels at the next line of pixel centers when it reaches the end of the current line of pixel centers.

As the vertical displacement ΔY between successive lines of virtual pixels centers may be less than the vertical size of a bin, not every vertical step to a new line of pixel centers necessarily implies use of a new line of bins. Thus, a vertical step to a new line of pixel centers will be referred to as a nontrivial drop down when it implies the need for a new line of bins. Each time the filtering unit FU(K) makes a nontrivial drop down to a new line of pixel centers, one of the bin scan line memories may be loaded with a line of bins in anticipation of the next nontrivial drop down.

Much of the above discussion has focused on the use of six bin scanline memories in each filtering unit. However, more generally, the number of bin scanline memories may be one larger than the diameter (or side length) of the bin neighborhood used for the computation of a single pixel. (For example, in an alternative embodiment, the bin neighborhood may be a 7×7 array of bins.)

Furthermore, each of the filtering units FU(K) may include a bin cache array to store the memory bins that are immediately involved in a pixel computation. For example, in some embodiments, each filtering unit FU(K) may include a 5×5 bin cache array, which stores the 5×5 neighborhood of bins that are used in the computation of a single pixel. The bin cache array may be loaded from the bin scanline memories.

As noted above, each rendering pipeline of the rendering engine 300 generates sample positions in the process of rendering primitives. Sample positions within a given spatial bin may be generated by adding a vector displacement $(\Delta X, \Delta Y)$ to the vector position $(X_{bin}, Y_{bin})$ of the bin's origin (e.g. the top-left corner of the bin). To generate a set of sample positions within a spatial bin implies adding a corresponding set of vector displacements to the bin origin. To facilitate the generation of sample positions, each rendering pipeline may include a programmable jitter table which stores a collection of vector displacements $(\Delta X, \Delta Y)$. The jitter table may have sufficient capacity to store vector displacements for an $M_J \times N_J$ tile of bins. Assuming a maximum sample position density of $D_{max}$ samples per bin, the jitter table may then store $M_J * N_J * D_{max}$ vector displacements to support the tile of bins. Host software may load the jitter table with a pseudo-random pattern of vector displacements to induce a pseudo-random pattern of sample positions. In one embodiment, $M_J = N_J = 2$ and $D_{max} = 16$.

A straightforward application of the jitter table may result in a sample position pattern, which repeats with a horizontal period equal to $M_J$ bins, and a vertical period equal to $N_J$ bins. However, in order to generate more apparent randomness in the pattern of sample positions, each rendering engine may also include a permutation circuit, which applies transformations to the address bits going into the jitter table and/or transformations to the vector displacements coming out of the jitter table. The transformations depend on the bin horizontal address $X_{bin}$ and the bin vertical address $Y_{bin}$.

Each rendering unit may employ such a jitter table and permutation circuit to generate sample positions. The sample positions are used to compute samples, and the samples are written into sample buffer 500. Each filtering unit of the filtering engine 600 reads samples from sample buffer 500, and may filter the samples to generate pixels. Each filtering unit may include a copy of the jitter table and permutation circuit, and thus, may reconstruct the sample positions for the samples it receives from the sample buffer 500, i.e., the same sample positions that are used to compute the samples in the rendering pipelines. Thus, the sample positions need not be stored in sample buffer 500.

As noted above, sample buffer 500 stores the samples, which are generated by the rendering pipelines and used by the filtering engine 600 to generate pixels. The sample buffer 500 may include an array of memory devices, e.g., memory devices such as SRAMs, SDRAMs, RDRAMs, 3DRAMs or 3DRAM64s. In one collection of embodiments, the memory devices are 3DRAM64 devices manufactured by Mitsubishi Electric Corporation.

RAM is an acronym for random access memory.

SRAM is an acronym for static random access memory.

DRAM is an acronym for dynamic random access memory.

SDRAM is an acronym for synchronous dynamic random access memory.

RDRAM is an acronym for Rambus DRAM.

The memory devices of the sample buffer may be organized into $N_{MB}$ memory banks denoted MB(0), MB(1), MB(2), ..., MB($N_{MB}$−1), where $N_{MB}$ is a positive integer. For example, in one embodiment, $N_{MB}$ equals eight. In another embodiment, $N_{MB}$ equals sixteen.

Each memory bank MB may include a number of memory devices. For example, in some embodiments, each memory bank includes four memory devices.

Each memory device stores an array of data items. Each data item may have sufficient capacity to store sample color in a double-buffered fashion, and other sample components such as z depth in a single-buffered fashion. For example, in one set of embodiments, each data item may include 116 bits of sample data defined as follows:

30 bits of sample color (for front buffer),
30 bits of sample color (for back buffer),
16 bits of alpha and/or overlay,
10 bits of window ID,
26 bits of z depth, and
4 bits of stencil.

Each of the memory devices may include one or more pixel processors, referred to herein as memory-integrated pixel processors. The 3DRAM and 3DRAM64 memory devices manufactured by Mitsubishi Electric Corporation have such memory-integrated pixel processors. The memory-integrated pixel processors may be configured to apply processing operations such as blending, stenciling, and Z buffering to samples. 3DRAM64s are specialized memory devices configured to support internal double-buffering with single buffered Z in one chip.

Figure 13:
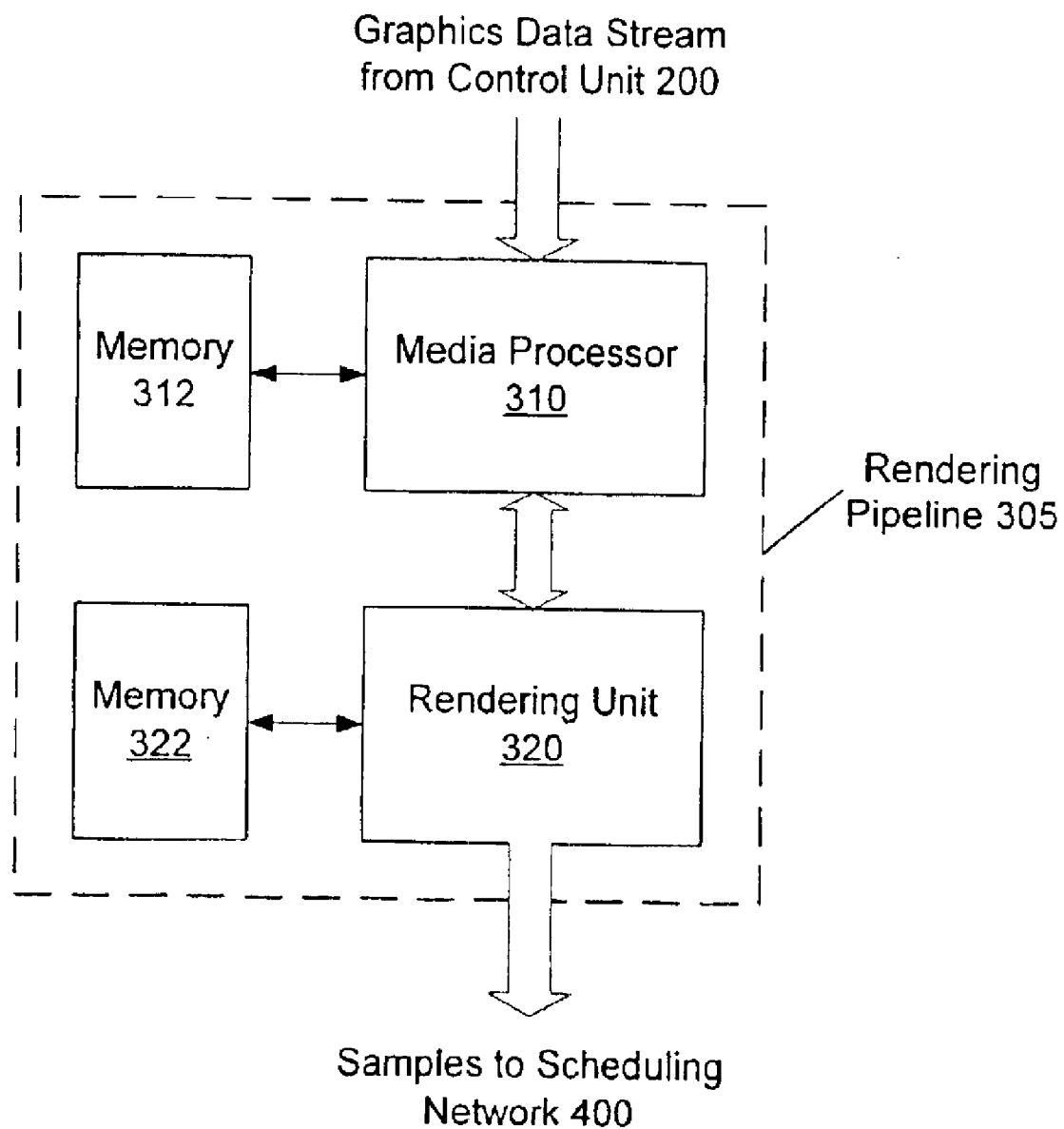
FIG. 13 illustrates one set of embodiments of a rendering pipeline comprising a media processor and a rendering unit.

As described above, the rendering engine 300 may include a set of rendering pipelines RP(0), RP(1), ..., RP($N_{PL}$−1). FIG. 13 illustrates one embodiment of a rendering pipeline 305 that may be used to implement each of the rendering pipelines RP(0), RP(1), ..., RP($N_{PL}$−1). The rendering pipeline 305 may include a media processor 310 and a rendering unit 320.

The media processor 310 may operate on a stream of graphics data received from the control unit 200. For example, the media processor 310 may perform the three-dimensional transformation operations and lighting operations such as those indicated by steps 710 through 735 of FIG. 4. The media processor 310 may be configured to support the decompression of compressed geometry data.

The media processor 310 may couple to a memory 312, and may include one or more microprocessor units. The memory 312 may be used to store program instructions and/or data for the microprocessor units. (Memory 312 may also be used to store display lists and/or vertex texture maps.) In one embodiment, memory 312 comprises direct Rambus DRAM (i.e. DRDRAM) devices.

The rendering unit 320 may receive transformed and lit vertices from the media processor, and perform processing operations such as those indicated by steps 737 through 775 of FIG. 4. In one set of embodiments, the rendering unit 320 is an application specific integrated circuit (ASIC). The rendering unit 320 may couple to memory 322 which may be used to store texture information (e.g., one or more layers of textures). Memory 322 may comprise SDRAM (synchronous dynamic random access memory) devices. The rendering unit 310 may send computed samples to sample buffer 500 through scheduling network 400.

Figure 14:
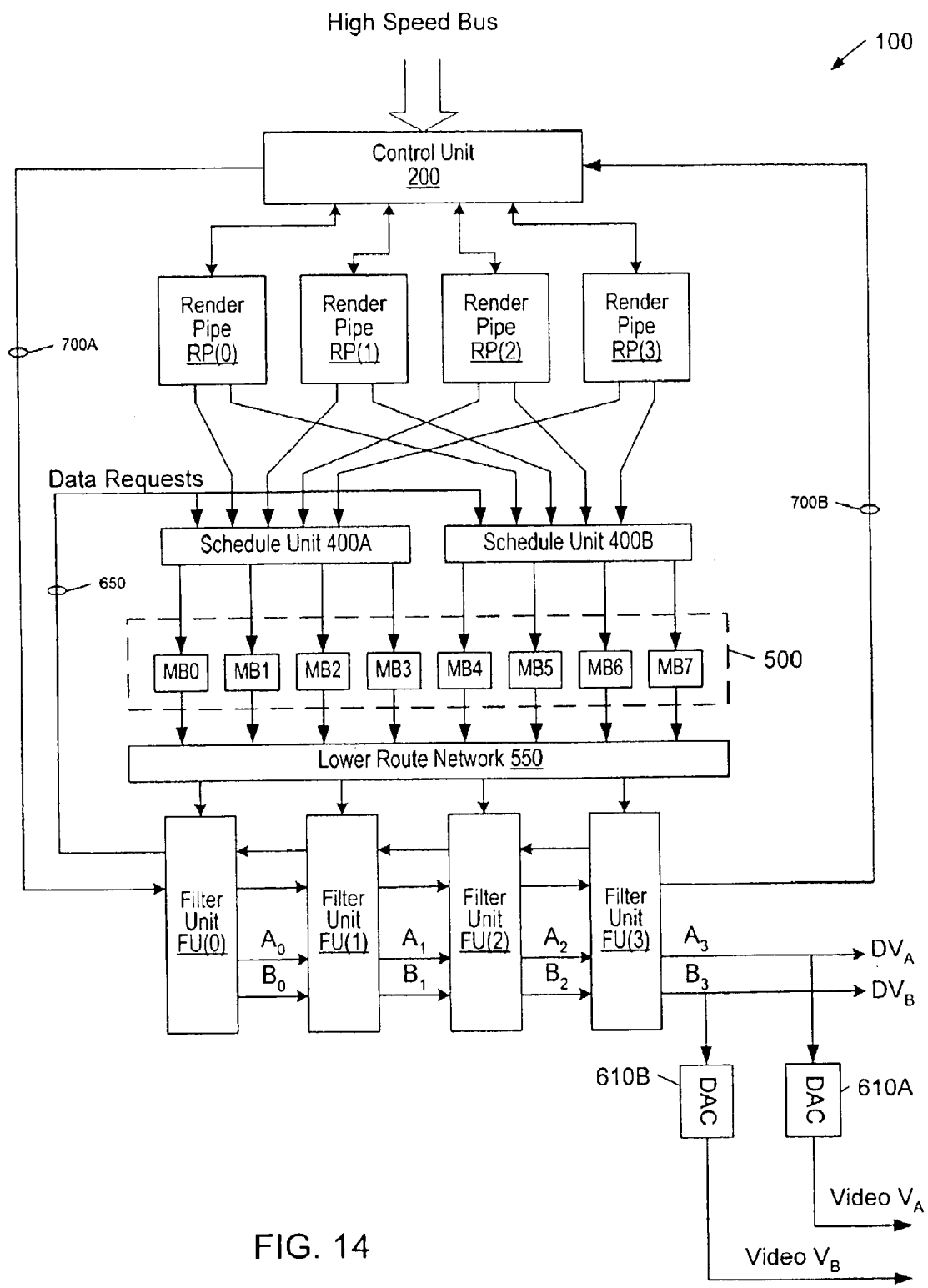
FIG. 14 illustrates one embodiment of graphics accelerator 100.

FIG. 14 illustrates one embodiment of the graphics accelerator 100. In this embodiment, the rendering engine 300 includes four rendering pipelines RP(0) through RP(3), scheduling network 400 includes two schedule units 400A and 400B, sample buffer 500 includes eight memory banks MB(0) through MB(7), and filtering engine 600 includes four filtering units FU(0) through FU(3). The filtering units may generate two digital video streams $DV_A$ and $DV_B$. The digital video streams $DV_A$ and $DV_B$ may be supplied to digital-to-analog converters (DACs) 610A and 610B, where they are converted into analog video signals $V_A$ and $V_B$ respectively. The analog video signals are supplied to video output ports. In addition, the graphics system 100 may include one or more video encoders. For example, the graphics system 100 may include an S-video encoder.

Figure 15:
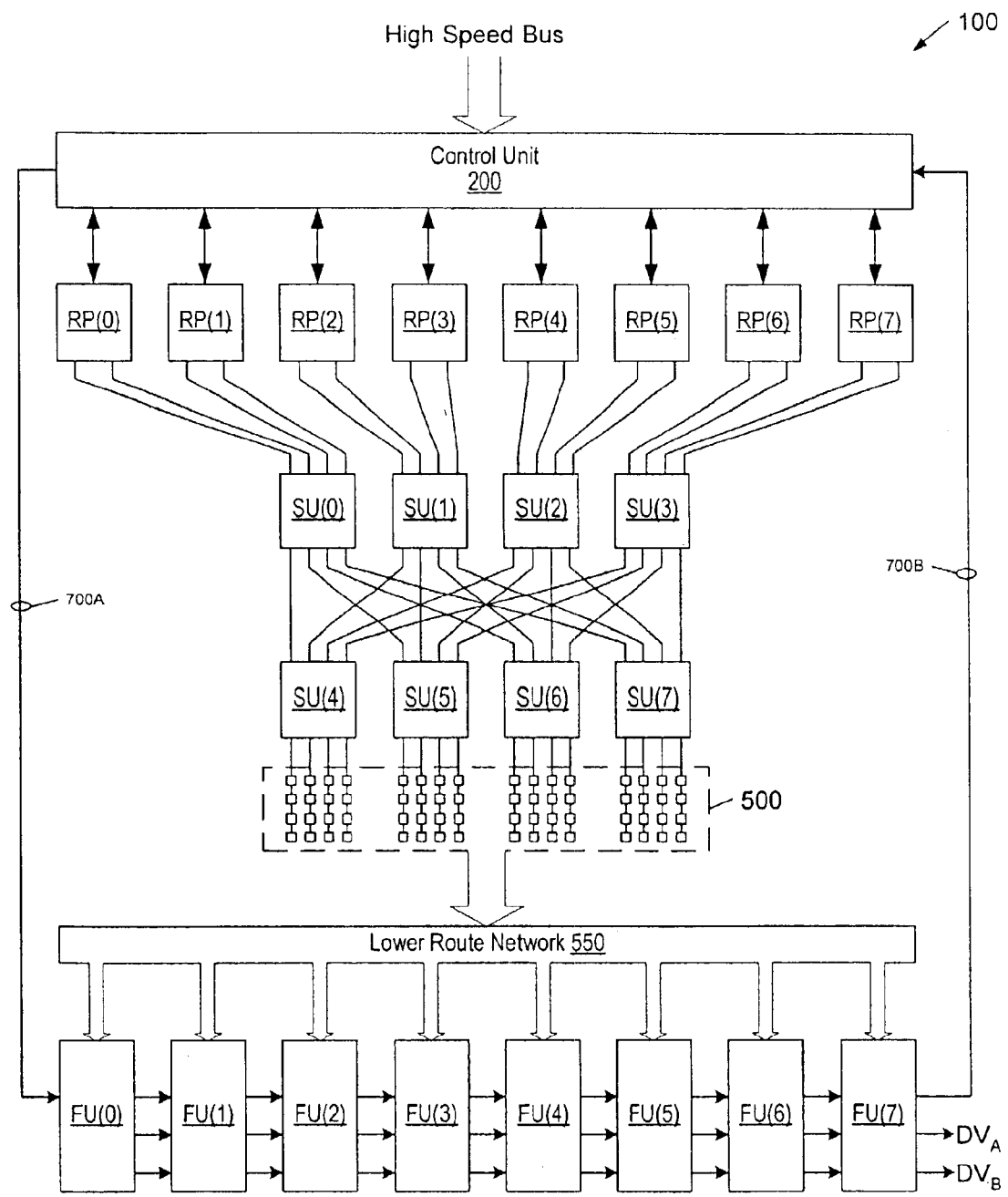
FIG. 15 illustrates another embodiment of graphics accelerator 100.

FIG. 15 illustrates another embodiment of graphics system 100. In this embodiment, the rendering engine 300 includes eight rendering pipelines RP(0) through RP(7), the scheduling network 400 includes eight schedule units SU(0) through SU(7), the sample buffer 500 includes sixteen memory banks, the filtering engine 600 includes eight filtering units FU(0) through FU(7). This embodiment of graphics system 100 also includes DACs to convert the digital video streams $DV_A$ and $DV_B$ into analog video signals.

Observe that the schedule units are organized as two layers. The rendering pipelines couple to the first layer of schedule unit SU(0) through SU(3). The first layer of schedule units couple to the second layer of schedule units SU(4) through SU(7). Each of the schedule units in the second layer couples to four banks of memory device in sample buffer 500.

The embodiments illustrated in FIGS. 14 and 15 are meant to suggest a vast ensemble of embodiments that are obtainable by varying design parameters such as the number of rendering pipelines, the number of schedule units, the number of memory banks, the number of filtering units, the number of video channels generated by the filtering units, etc.

It is noted that FIGS. 3, 6, 8 and 9 provide various examples of sample-positioning patterns. These sample-positioning patterns assist in conveying the notion that sample positions may be distributed in a stochastic fashion in sample space. However, these sample position patterns do not necessarily represent examples of patterns generated by the tile permutation methodologies described herein and especially below.

Permuted 2-D Sample Location Pattern

FIGS. 16 through 23 provide details for various embodiments of a system and method for creating a reproducible set of k sample locations for each sample bin in sample space by permuting a set of $n^2k$ pre-selected sample locations that may be stored in a sample RAM in an array of n×n sample bins. Sample space may be covered by an M×N array of sample bins that are used to store sample values rendered for a graphics image. (M, N, n, and k are positive integers.)

Figure 16:
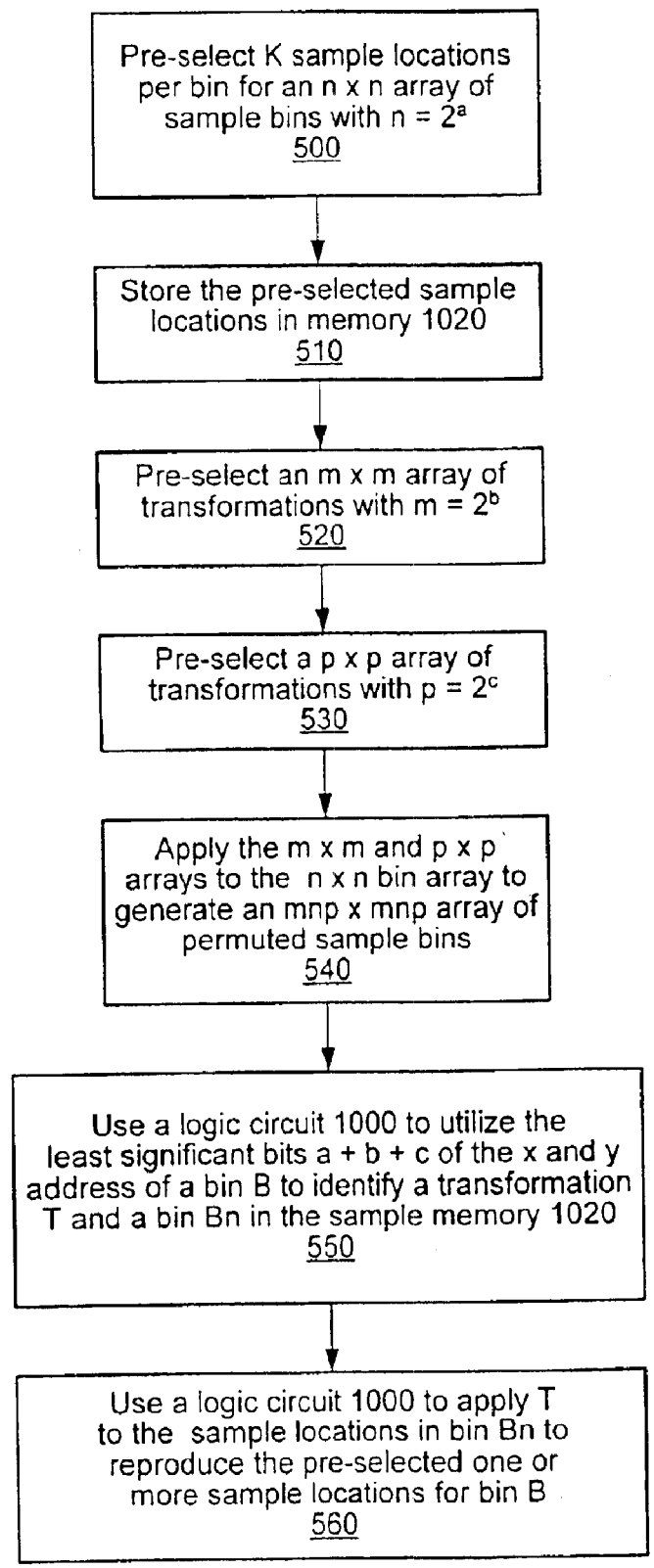
FIG. 16 is a flow chart of a set of embodiments of a method for reproducing pre-selected sample locations.
Figures 17A, 17B:
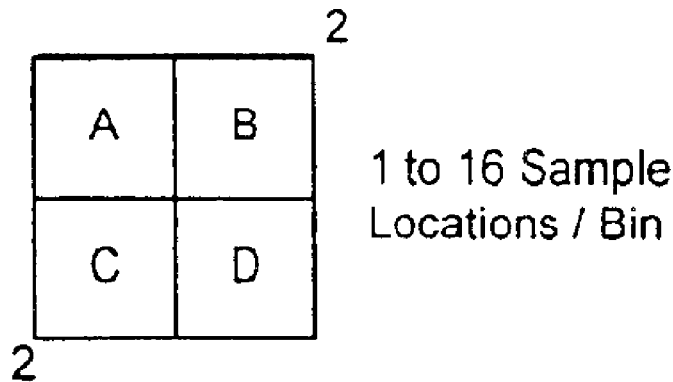
FIG. 17a illustrates a 2×2 sample bin array.
FIG. 17b is a table of 2-D transformations.

FIG. 16 provides a flowchart for a method of pre-selecting a sample location pattern and for reproducing the pre-selected pattern. Specific sample locations are selected for each sample bin of the n×n array of sample bins (step 500). Each sample bin may be assigned k sample locations. In some embodiments, n may be a power of 2 (so that $n=2^a$ and "a" is a positive integer). k may be programmable or specified by a user, and in one embodiment may be preset to any integer from 1 to 16. FIG. 17a illustrates the embodiment with n=2. The sample positions may be chosen to span the sample space within the n×n array of sample bins in a manner that may reduce aliasing effects and artifacts in a graphics image (that may be noticeable to human perception) when the n×n array is permuted and/or tiled to fill the M×N array of sample bins.

Figure 22:
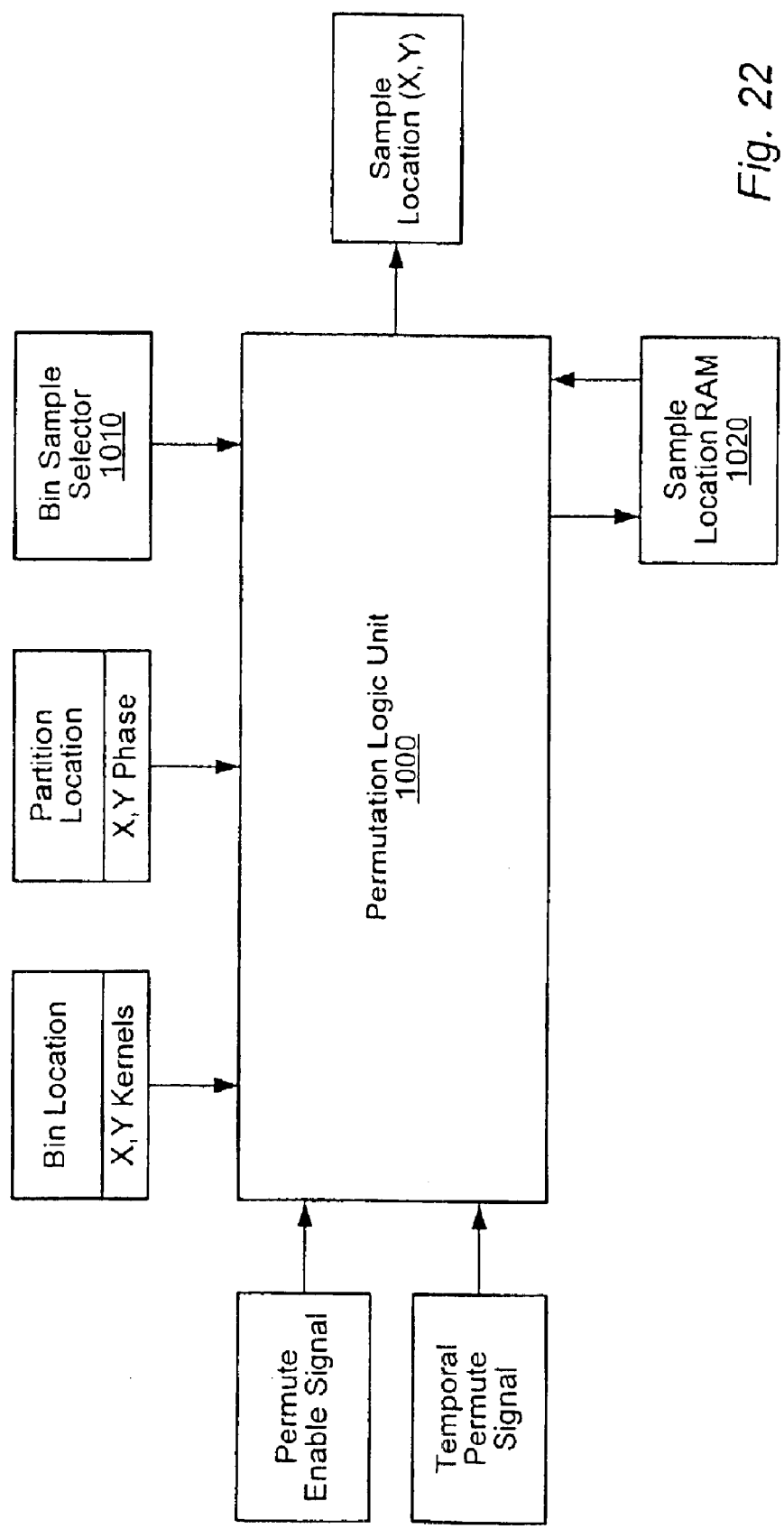
FIG. 22 is a block diagram of a set of embodiments of a system for reproducing pre-selected sample locations.

The $n^2k$ sample positions selected for the n×n array of sample bins may be stored in a memory 1020 of FIG. 22 (also referred to as a sample location memory, a sample location RAM, or a sample location cache) (step 510).

Figure 18:
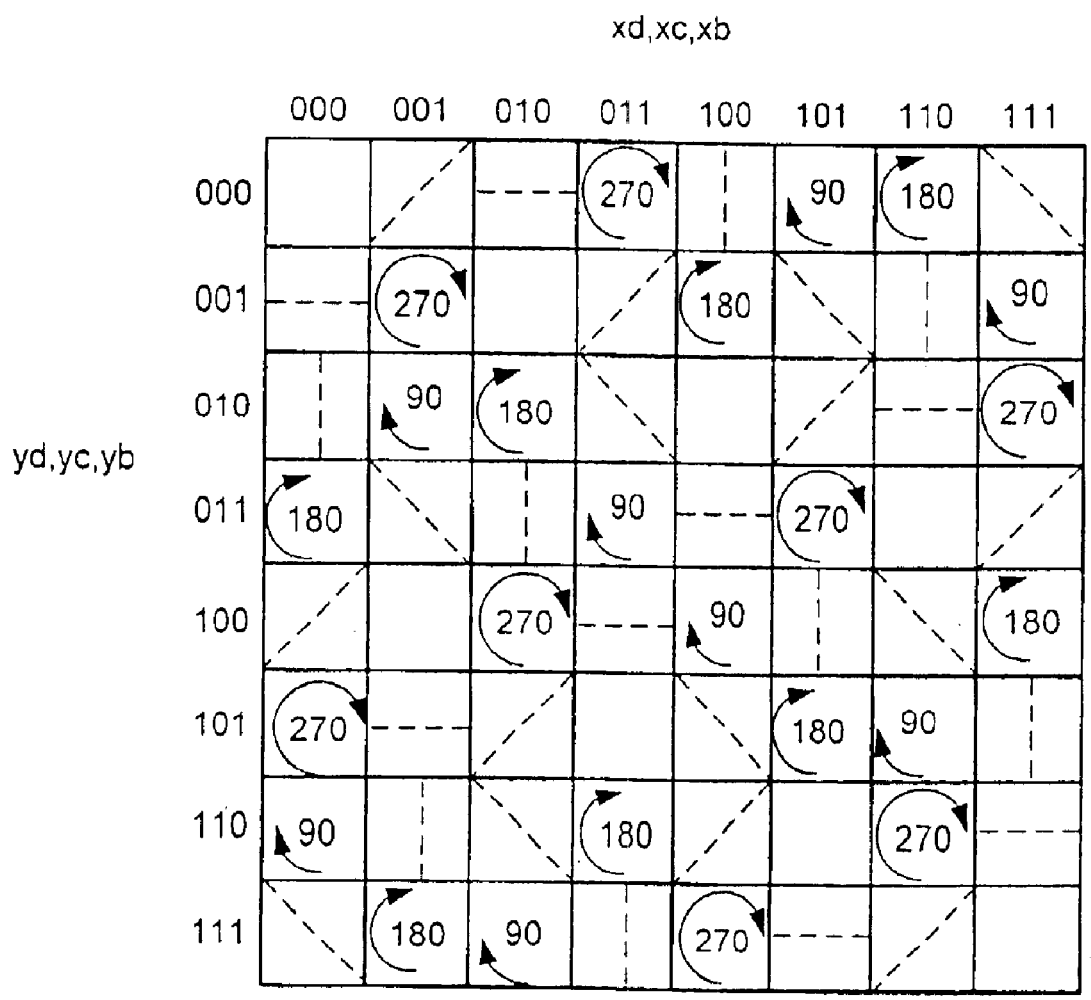
FIG. 18 illustrates one embodiment of an inner transformation array.
Figure 19:
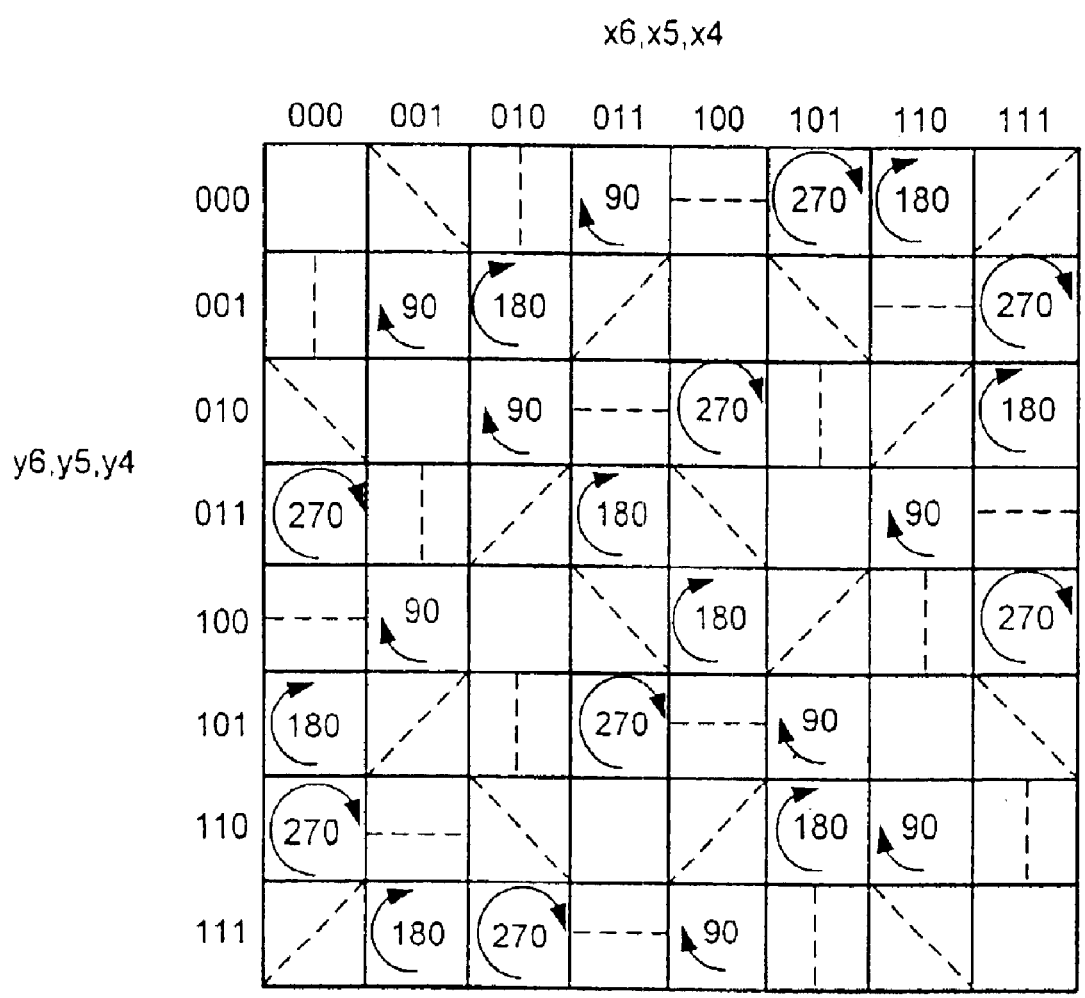
FIG. 19 illustrates one embodiment of an outer transformation array.

An m×m array of 2-D transformations may be selected from the 8 geometric transformations listed in FIG. 17b (step 520) (m is a positive integer and in some embodiments m may be a power of 2, so that $m=2^b$, and b is a positive integer). The 8 transformations form a group, and therefore, sequential applications of 2 or more of these transformations will have the same effect as a specific one of the 8 transformations. Two examples of m×m arrays of 2-D transformations are illustrated in FIGS. 18 and 19 for m=8.

In some embodiments, a second p×p array of 2-D transformations may be selected from the 8 transformations listed in FIG. 17b (step 530). By applying the transformation specified at each position of the m×m array to the n×n array of sample bins, an nm×nm array of sample bins may be populated with sample locations. By applying the transformation specified at each position in the p×p array to the mn×mn array of sample bins, an mnp×mnp array of sample bins may be populated with sample locations (step 540).

In some embodiments, an additional array of 2-D transformations may be used to further increase the size of the sample bin array populated with permuted sets of the n×n array of sample bins. In various embodiments, the n×n array, the nm×nm array, or the mnp×mnp array of sample bins may be tiled across the available sample space.

In some embodiments, a logic circuit 1000 (FIG. 22) may be used to reproduce (or generate) sample locations for a sample bin B at location (x,y) in sample space according to the one or more pre-selected transformation arrays applied to the pre-selected sample locations stored in the n×n array of sample bins (steps 550 and 560). In embodiments with one transformation array, the logic circuit splits both the x and y location of sample bin B into the "a" least significant bits and the next "b" more significant bits and ignores the bits remaining in the location of sample bin B. The logic circuit in these embodiments, may be configured to use the "b" bits of both the x and y location to identify a specific transformation T from the m×m array of transformations that corresponds to the location of sample bin B and to apply the inverse of the transformation T to the "a" bits of both the x and y location to specify sample bin Bn from the n×n sample bin array that corresponds to the location of sample bin B, and then to reproduce one or more pre-selected sample positions for sample bin B by applying the specific transformation T to a first one or more of the k sample positions stored in the memory for the specific sample bin Bn.

Figure 20A:
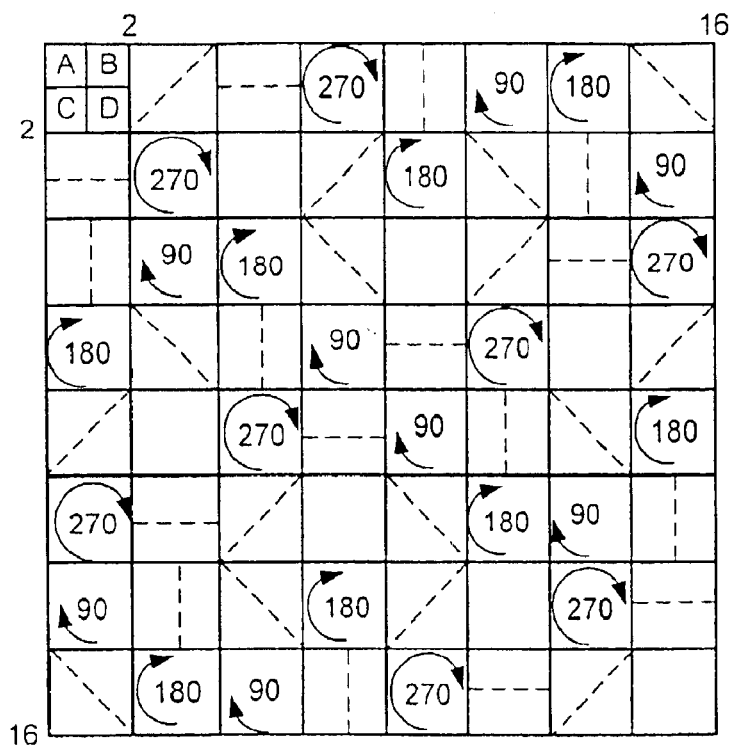
FIG. 20a illustrates one embodiment of an inner bin array.
Figure 20B:
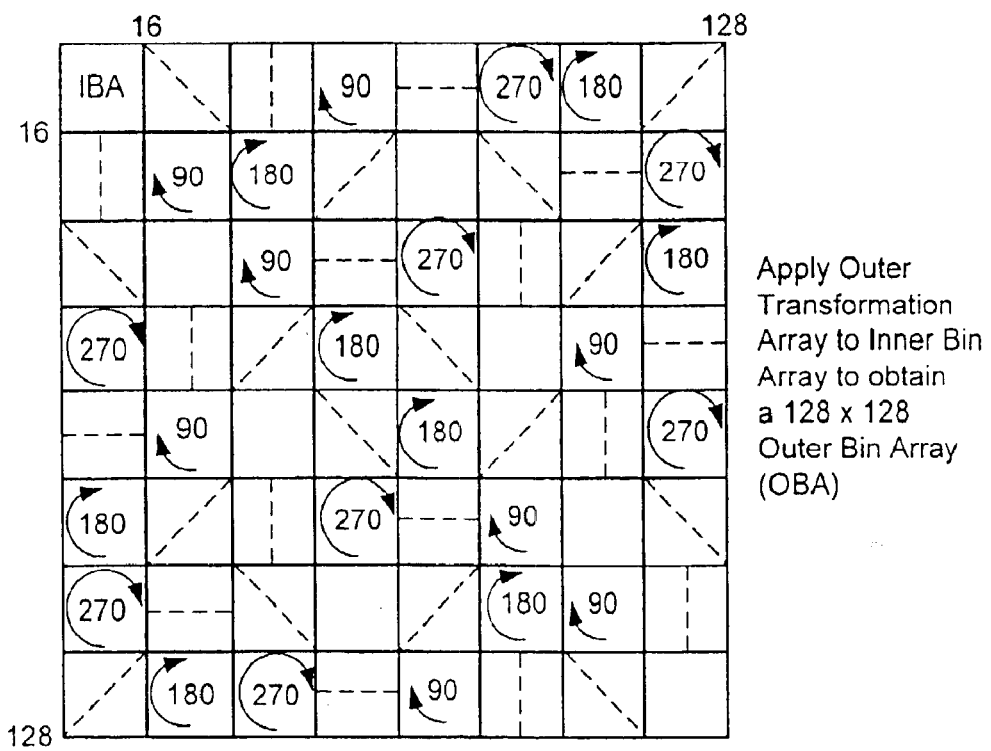
FIG. 20b illustrates one embodiment of an outer bin array.
Figure 20C:
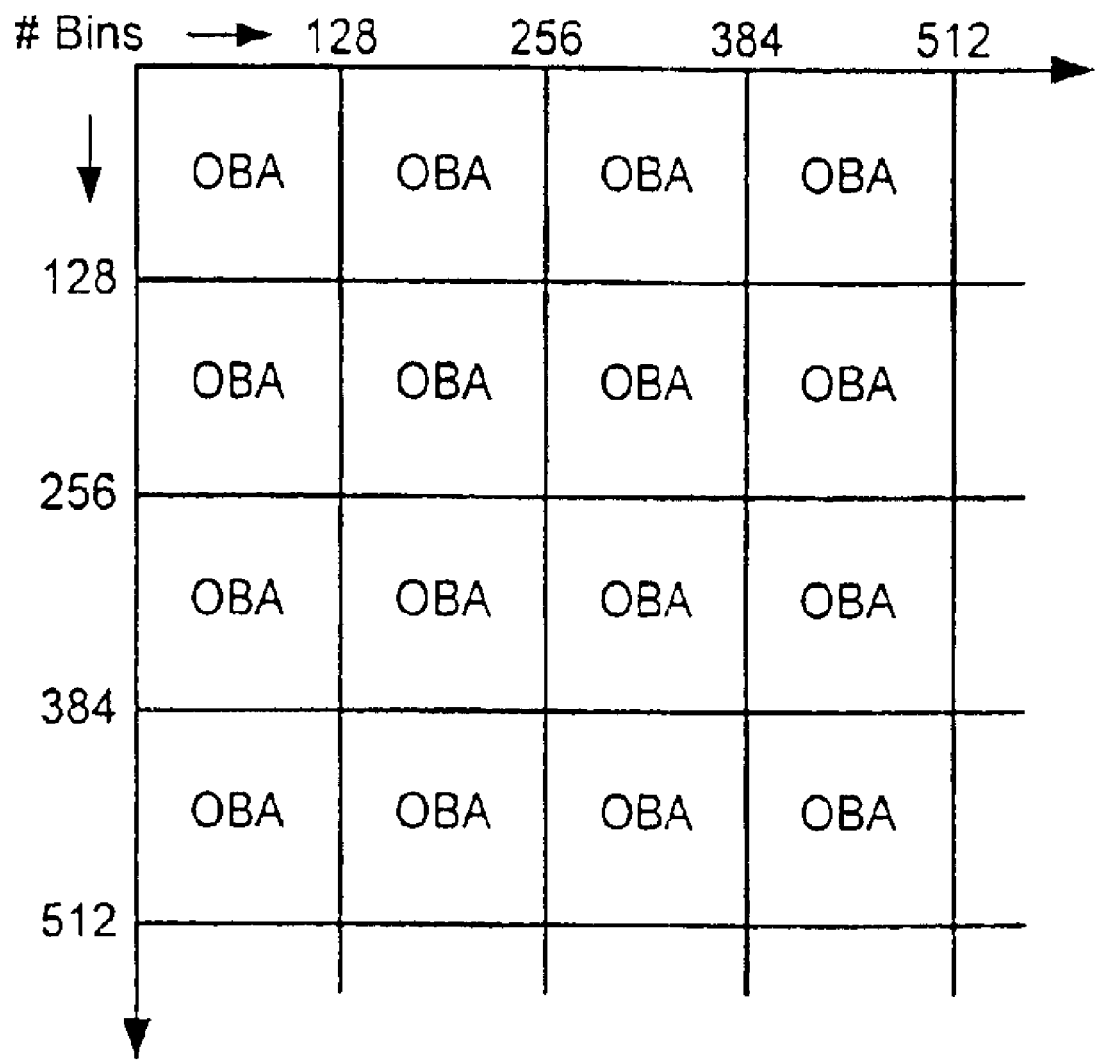
FIG. 20c illustrates tiling an outer bin array to fill available sample space.
Figure 21:
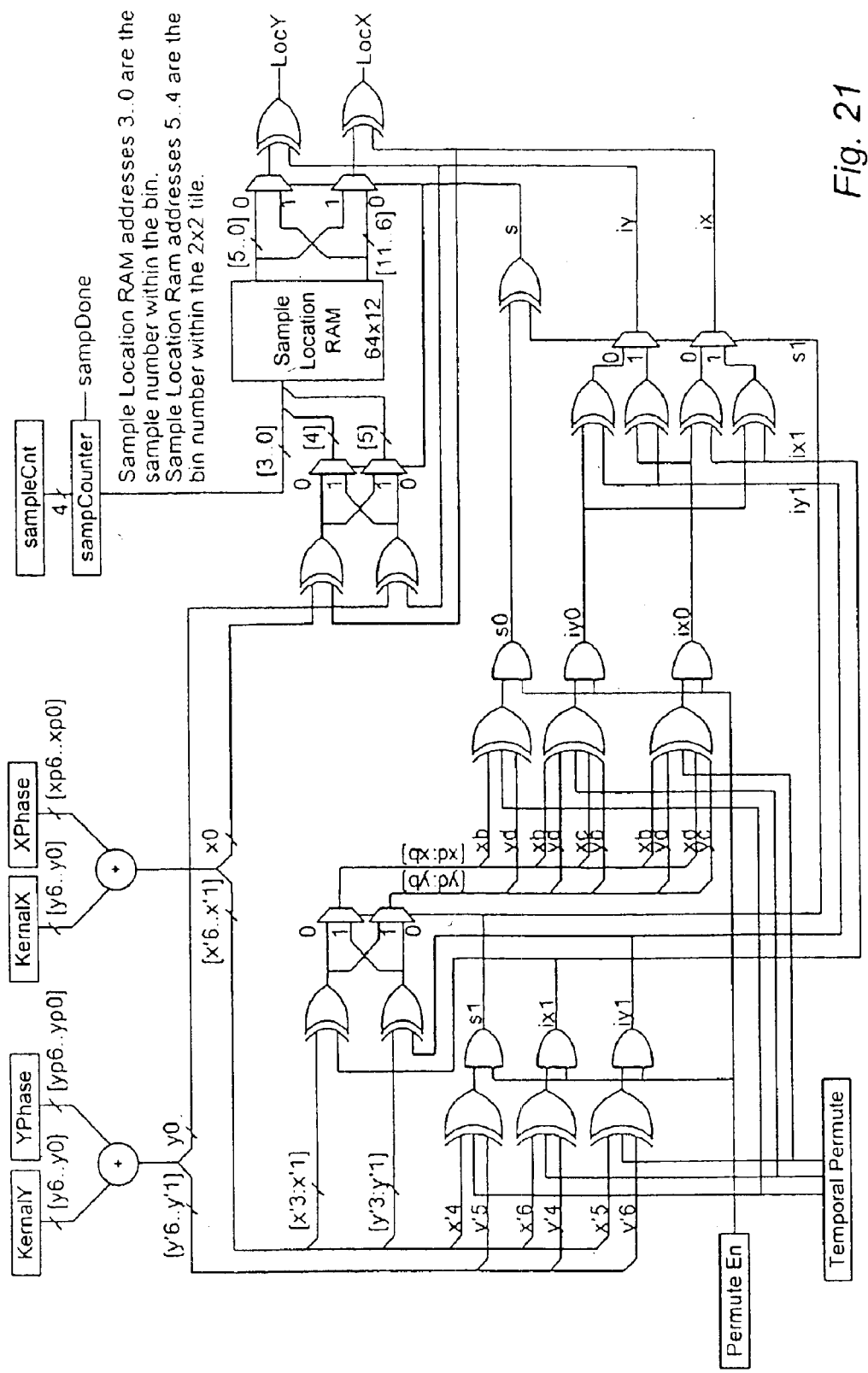
FIG. 21 is a circuit drawing of one embodiment of a permutation logic circuit.

FIGS. 20a, 20b, and 20c illustrate one set of embodiments of a method to reproduce pre-selected sample positions for each sample bin in the available sample space. In these embodiments, an 8×8 array of transformations shown in FIG. 18, called an Inner Transformation Array, may be applied to a 2×2 array of sample bins to obtain the 16×16 array of sample bins shown in FIG. 20a and referred to as an Inner Bin Array. A second 8×8 array of transformations shown in FIG. 19, called an Outer Transformation Array, may be applied to the Inner Bin Array to obtain the 128×128 Outer Bin Array shown in FIG. 20b. The Outer Bin Array is then tiled across sample space as illustrated in FIG. 20c. A logic circuit of the type that may be used to reproduce pre-selected sample locations for a sample bin B with this method is shown in FIG. 21.

The Outer Transformation Array may selected to be different from the Inner Transformation Array in order to avoid self similarity, and thereby, create more apparent randomness, in the induced sample positioning pattern.

FIG. 22 is a simplified block diagram illustrating a system for reproducing pre-selected sample locations for a specific sample bin in sample space. A permutation logic unit 1000 may be connected to one or more devices including, but not limited to, a host computer, a graphics accelerator, a rendering unit, a filtering unit, a sample location memory 1020, and a bin sample selector 1010. The sample location memory 1020 may be programmable and may be configured to store k pre-selected sample locations for each bin in an n×n array of sample bins, where k is a positive integer. Sample location memory 1020 may be an external memory, a memory cache integrated into the logic unit 1000, a series of registers, or other semiconductor memory device.

The permutation logic unit 1000 may be configured to receive the X and Y kernels of a sample bin location (X,Y). The kernels may be a specific number of the least significant bits of X and Y that will be used by the permutation logic unit 1000. The discarding of the more significant bits implies a tiling of the permuted bins. Therefore, the discarded bits do not affect the sample locations generated.

The bin sample selector 1010 may be configured to sequence the permutation logic unit 1000 through the sample locations stored in a selected sample bin in the sample location memory 1020. The bin sample selector 1010 also may limit the number of sample positions generated to a specified value that may be supplied by a user or by one of the devices connected to the permutation logic unit 1000.

In some embodiments, the permutation logic unit 1000 may be configured to respond to a permute enable signal. This signal may turn off the permutation identification logic and induce a regular or periodic tiling of the n×n sample bin array across available sample space.

In other embodiments, the permutation logic unit 1000 may be configured to respond to a temporal permute signal. This signal may consist of a repeating sequence of signals of j bits per signal (j is a positive integer). The sequence may have one or more members with an arbitrary period. The temporal permute signal may scramble the transformations selected by the permutation logic unit 1000 in a repeating sequence at a selected frequency. FIG. 21 illustrates one embodiment for j=3.

FIG. 23 provides an explanation of the logic of applying the inverse of transformation T to the "a" address bits of bin B in order to obtain the address of a corresponding bin Bn in the n×n sample bin array. The methodology described above of applying to the "a" address bit the inverse of a transformation T defined by the "b" address bits, and applying the transformation T to the sample positions (or deltas) emerging from the selected bin of the sample location RAM, ensures that the n×n array of bins stored in the sample location RAM is transformed as a rigid object.

Figure 24:
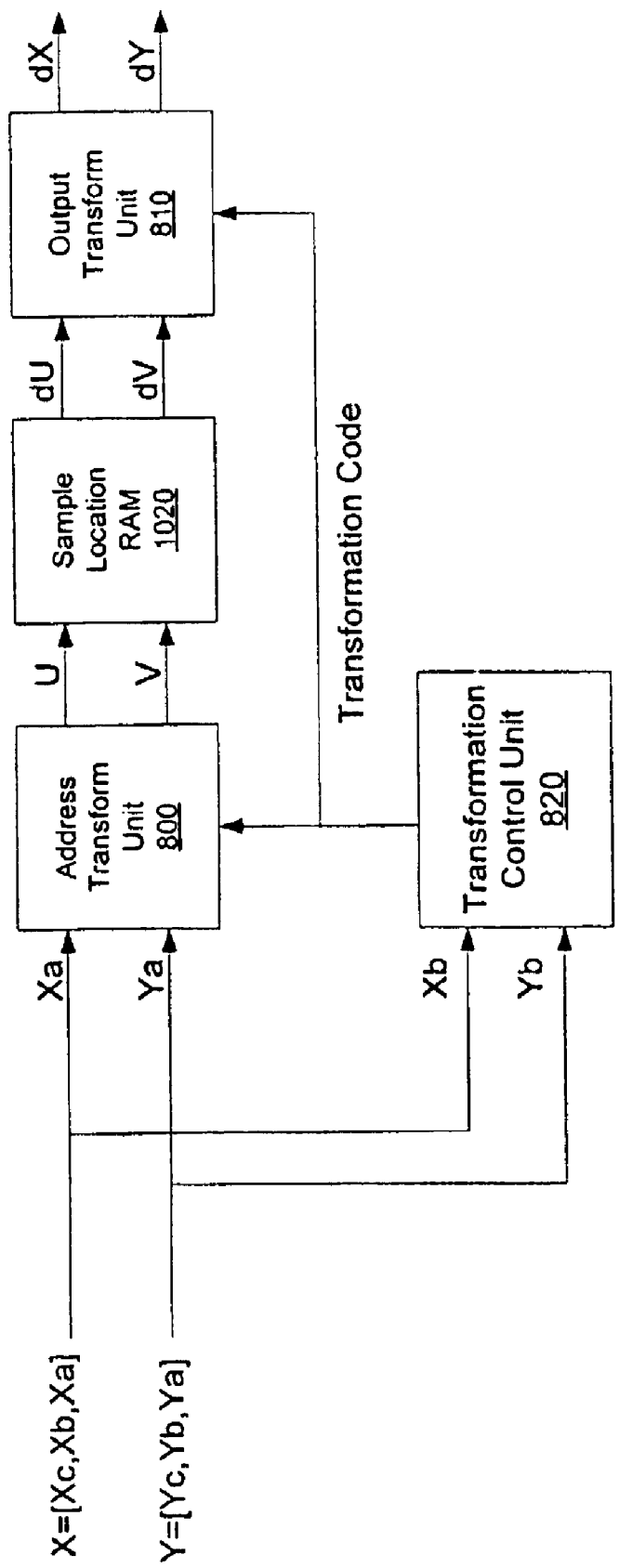
FIG. 24 illustrates another set of embodiments of a system for reproducing pre-selected sample locations.

FIG. 24 provides a block diagram of another set of embodiments of a system and method for reproducing, for a sample bin in sample space, a pre-selected permutation of a pre-selected set of sample locations in a corresponding sample bin of an n×n sample bin array (also referred to as a tile or a tile of bins). In these embodiments, the system for reproducing sample locations for a specific sample bin includes an input port for receiving a two-dimensional address that specifies a location of a sample bin, a sample location memory 1020 configured to store the pre-selected sample locations for the tile of bins, an address transform unit (also referred to as a pre-transformation unit) 800, an output transform unit (also referred to as a post-transformation unit) 810, and a transformation control unit 820, configured to receive a first portion (Xb and Yb) of the two-dimensional bin address, and to determine a transformation code for a first transformation T based on the first portion.

The address transform unit 800 may be configured to apply an inverse of the first transformation T to a second portion (Xa and Ya) of the two-dimensional bin address in response to receiving the transformation code, thereby generating memory address bits for the corresponding sample bin in the n×n array. The sample location memory 1020 may be configured to output a first set of sample displacements in response to receiving the memory address bits. The output transform unit 810 may be configured to apply the first transformation to the first set of sample displacements in response to receiving the transformation code, thereby generating a second set of sample displacements.

In one set of embodiments, a method for reproducing sample locations for a specific sample bin includes operating on a first portion of a two-dimensional address of the sample bin to determine a first transformation T, applying an inverse of the first transformation T to a second portion of the two-dimensional address of the sample bin to determine a modified two-dimensional address, reading a first set of sample displacements from a sample location memory 1020 using the modified two-dimensional address, applying the first transformation T to the first set of sample displacements to determine a second set of sample displacements, and adding the second set of sample displacements to the two-dimensional address of the sample bin to determine the sample locations of the sample bin.

The first transformation T may be one of a group of eight two-dimensional transformations. The transformation control unit 820 may be configured to implement a pre-selected mapping of each state of the first portion of the two-dimensional address into a corresponding transformation T selected from the group of eight transformations (see FIG. 17*b*).

In some embodiments, the transformation control unit 820 may be a combinational logic network. In other embodiments, the transformation control unit 820 may include a lookup table that stores a transformation code for each state of the first portion of the two-dimensional address. In still other embodiments, the transformation control unit 820 may include a combinational logic network and one or more lookup tables.

The address transform unit 800 may include two multiplexors and a pair of XOR gates, where a first bit of the transformation code may control the two multiplexors.

The output transform unit 810 may include two multiplexors and a pair of XOR gates, where a first bit of the transformation code may control the two multiplexors.

This method may be applied to reproduce pre-selected sample locations in a graphics processor when rendering sample values in response to received graphics data. This method may also be applied to reproduce pre-selected sample locations in a filtering unit when reading sample values corresponding to the pre-selected sample locations from a sample buffer, and operating on the sample values and sample locations to determine pixel values.

In other embodiments, a method for reproducing pre-selected sample locations for a sample bin in an array of sample bins includes a) receiving a first two-dimensional bin address specifying an X bin address and a Y bin address for a location of the sample bin in the array of sample bins, b) operating on a first portion of the first two-dimensional bin address to determine a first transformation T, where the first portion includes a first set of bits in the X bin address and a first set of bits in the Y bin address, c) applying an inverse of the first transformation T to a second two-dimensional address composed of a second set of bits in the X bin address and a second set of bits in the Y bin address to generate a two-dimensional memory address, d) accessing a first set of sample displacements from a sample location memory using the two-dimensional memory address, e) applying the first transformation T to each sample displacement of the first set to generate a second set of sample displacements, and f) adding the second set of sample displacements to the first two-dimensional bin address to determine the sample locations for the sample bin. The sample location memory 1020 may store pre-selected sample location displacements for an n×n array of bins, where n is a positive integer, where the two-dimensional memory address selects one of the bins in the n×n array, and where the first set of sample displacements are accessed from the selected bin. The sample location memory 1020 may be dynamically programmable.

Numerous variations and modifications will become apparent to those skilled in the art once the above disclosure is fully appreciated. It is intended that the following claims be interpreted to embrace all such variations and modifications.

What is claimed is:

1. A method for generating sample locations for a sample bin in sample space, the method comprising:

operating on a set of the least significant bits of an address of a sample bin at (x,y) in sample space to identify a corresponding pre-selected 2-D transformation T from a pre-selected m×m array of transformations and to identify a corresponding sample bin (i,j), from an n×n array of sample bins with pre-selected sample locations; and outputting one or more sample locations by applying transformation T to one or more of the sample locations pre-selected for the sample bin (i,j).

2. The method of claim 1, wherein transformation T is equivalent to a product of a pre-selected set of two or more transformations that are sequentially applied.

3. A method for generating sample locations, the method comprising:

receiving a two-dimensional bin address specifying a location of a bin in sample space;

identifying a transformation corresponding to the two-dimensional bin address from a pre-selected pattern of transformations that span sample space; and applying the identified transformation to a pre-selected set of sample locations corresponding to the two-dimensional bin address to output a permuted set of one or more sample locations.

4. The method of claim 3, wherein the identified transformation is a pre-selected set of two or more transformations that are sequentially applied to the pre-selected set of sample locations to output a permuted set of one or more sample locations.

5. The method of claim 3, wherein the identified transformation is a transformation that is equivalent to a product of a pre-selected set of two or more sequential transformations, and wherein the equivalent transformation is applied to the pre-selected set of sample locations to output a permuted set of one or more sample locations.

6. A method for generating sample locations that conform to a pre-selected pattern of permuted sample locations spanning sample space, the method comprising:

operating on a first portion of a two-dimensional bin address to identify a corresponding transformation based on the first portion and a pre-selected pattern of transformations that span sample space;

applying an inverse of the identified transformation to a second portion of the two-dimensional bin address to determine a modified two-dimensional address;

reading pre-selected first sample displacements from a sample location memory using the modified two-dimensional address; and applying the identified transformation to the first sample displacements to determine second sample displacements.

7. The method of claim 6, wherein the identified transformation is equivalent to a product of a pre-selected set of two or more transformations.

8. The method of claim 6, further comprising adding the two-dimensional address of the sample bin to the second set of sample displacements to generate sample locations.

9. The method of claim 6; wherein the first portion of the bin address is [Xb, Yb] and the second portion of the bin address is [Xa, Ya]; wherein the horizontal component X of the two-dimensional bin address is represented as X=[Xc, Xb,Xa]; wherein Xa is a contiguous set of least significant bits in X, Xb is a contiguous set of medium significant bits in X, and Xc is a contiguous set of next more significant bits in X; wherein sizes of Xa, Xb and Xc are "a" bits, "b" bits and "c" bits respectively; wherein the vertical component Y of the two-dimensional bin address is represented as Y=[Yc, Yb,Ya], wherein Ya is a contiguous set of least significant bits in Y, Yb is a contiguous set of medium significance bits in Y, and Yc is a contiguous set of next more significant bits in Y; and wherein sizes of Ya, Yb and Yc are "a" bits, "b" bits and "c" bits respectively, "a" and "b" are integers greater than or equal to one, and c is an integer greater than or equal to zero.

10. The method in claim 9, wherein if the identified transformation is equivalent to a product of a pre-selected set of two or more transformations, then the first portion [Xb, Yb] may contain sufficient bits to identify two or more transformations.

11. A method for selecting reproducible sample locations in sample space, the method comprising:

selecting sample locations for each sample bin of an n×n array of sample bins, wherein each bin has k sample locations, wherein $n=2^a$, and wherein n, a, and k are positive integers;

storing the sample locations for the n×n array of sample bins in a sample location memory;

selecting an m×m array of 2-D transformations;

applying the transformation specified at each position in the m×m array to the n×n array of sample bins to specify sample locations in an mn×mn array of sample bins, wherein $m=2^b$, and wherein b and m are positive integers; and tiling the mn×mn sample bin array across the available sample space.

12. A method for selecting reproducible sample locations in sample space, the method comprising:

selecting sample locations for each sample bin of an n×n array of sample bins, wherein each bin has k sample locations, wherein $n=2^a$, and wherein n, a, and k are positive integers;

storing the sample locations for the n×n array of sample bins in a sample location memory;

selecting an m×m array of 2-D transformations;

applying the transformation specified at each position in the m×m array to the n×n array of sample bins to determine sample locations in an mn×mn array of sample bins, wherein $m=2^b$, and wherein b and m are positive integers;

selecting a p×p array of 2-D transformations;

applying the transformation specified at each position in the p×p array to the mn×mn array of sample bins to determine sample locations in a pmn×pmn array of sample bins, wherein $p=2^c$, and wherein c and p are positive integers; and tiling the pmn×pmn sample bin array across the available sample space.

13. A method for generating sample locations for a sample bin in an array of sample bins, the method comprising:

operating on a first portion of a two-dimensional address of the sample bin to determine a first transformation;

applying an inverse of the first transformation to a second portion of the two-dimensional address of the sample bin to determine a modified two-dimensional address;

reading first sample displacements from a sample location memory using the modified two-dimensional address; and applying the first transformation to the first sample displacements to determine second sample displacements.

14. The method of claim 13, further comprising:

adding the second sample displacements to the two-dimensional address of the sample bin to determine the sample locations of the sample bin.

15. The method of claim 14, further comprising:

rendering samples at the sample locations in response to received graphics data.

16. The method of claim 14, further comprising:

reading samples corresponding to the sample locations from a sample buffer; and operating on the samples and sample locations to determine pixel values.

17. A method for generating reproducible sample locations for a sample bin in sample space, the method comprising:

receiving a two-dimensional bin address specifying a location of the sample bin, wherein the two-dimensional bin address includes an X bin address and a Y bin address;

operating on a first portion of the two-dimensional bin address to identify a corresponding transformation from a pattern of transformations, wherein the first portion comprises a first set of bits in the X bin address and a first set of bits in the Y bin address;

applying an inverse of the identified transformation to a second portion of the two-dimensional address to generate a two-dimensional memory address, wherein the second portion comprises a second set of bits in the X bin address and a second set of bits in the Y bin address;

accessing a first set of sample displacements from a sample location memory using the two-dimensional memory address;

applying the identified transformation to the first set of sample displacements to generate a second set of sample displacements; and adding the second set of sample displacements to the two-dimensional bin address to determine the sample locations for the sample bin.

18. The method of claim 17, wherein the sample location memory stores sample location displacements for an n×n array of bins, wherein n is a positive integer, wherein the two-dimensional memory address selects one of the bins in the n×n array, and wherein the first set of sample displacements are accessed from the selected bin.

19. A system for generating sample locations, the system comprising:

means for receiving a two-dimensional bin address specifying a position of a bin in sample space;

means for identifying a transformation corresponding to the two-dimensional bin address from a pre-selected pattern of transformations that span sample space; and means for applying the identified transformation to a pre-selected set of sample displacements to output a permuted set of one or more sample displacements.

20. The system of claim 19, wherein the identified transformation is equivalent to a product of a pre-selected set of two or more sequential transformations.

21. A system for generating sample locations, the system comprising:

a sample generation circuit, wherein each circuit is configured to:

receive a two-dimensional bin address specifying a position of a bin in sample space;

identify a transformation corresponding to the two-dimensional bin address from a pre-selected pattern of transformations that span sample space; and apply the identified transformation to a pre-selected set of sample displacements to output a permuted set of one or more sample displacements.

22. The system of claim 21, wherein the identified transformation is an equivalent transformation to a sequential application of a pre-selected set of two or more transformations corresponding to the two-dimensional bin address.

23. The system of claim 21, further comprising a graphics accelerator, wherein the graphics accelerator comprises one or more rendering pipelines with one or more sample generation circuits, and one or more filtering units with one or more sample generation circuits.

24. The system of claim 23, wherein each graphics accelerator generates video pixels for one or more display devices.

25. A sample generation circuit for generating sample locations, the circuit comprising:

a transformation control unit configured to receive a first portion of a two-dimensional bin address specifying a location of a bin in sample space, and identify a corresponding transformation based on the first portion and a pre-selected pattern of transformations that span sample space;

an address transform unit configured to receive a second portion of the two-dimensional bin address and to apply an inverse of the identified transformation to the second portion, thereby generating a memory address defining a bin from an array of bins containing pre-selected sample displacements;

a sample location memory configured to store the pre-selected sample displacements for an array of bins, wherein the sample location memory is configured to output a first sequence of sample displacements in response to receiving the memory address; and an output transform unit, wherein the output transform unit is configured to apply the identified transformation to the first sequence of sample displacements to generate a second output sequence of sample displacements.

26. The system of claim 25, wherein the array of bins containing pre-selected sample displacements is a square array of sample bins.

27. The system of claim 25, wherein the array of bins containing pre-selected sample displacements is a rectangular array of sample bins.

28. The system of claim 25, wherein the transformation control unit is configured to receive a permute enable signal, wherein one state of the signal enables permutation of the pre-selected sample locations across sample space, and another state stops permutation and tiles the pre-selected sample locations across sample space.

29. The system of claim 25, wherein the transformation control unit is configured to receive a temporal permute signal that alters the identified transformation and varies the alteration in time.

30. The system of claim 25, further comprising a bin sample selector configured to sequentially output one or more sample locations stored in a selected sample bin in the sample location memory to the output transform unit.

31. The system of claim 30, wherein the number of sample locations output may be limited to a specified value.

32. The system of claim 30, wherein the number of sample locations output may be programmable or supplied by a user.

33. A sample generation circuit for generating sample locations for a sample bin, the sample generation circuit comprising:

a transformation control unit configured to receive a first portion of a two-dimensional bin address and determine a transformation code for a transformation from a pattern of transformations corresponding to the first portion of the two-dimensional bin address;

an address transform unit, wherein in response to receiving the transformation code the address transform unit is configured to apply an inverse of the transformation corresponding to the transformation code to a second portion of the two-dimensional bin address, thereby generating memory address bits;

a sample location memory configured to store pre-selected sample displacements for an array of bins, and to output a first set of sample displacements in response to receiving the memory bits; and an output transform unit, wherein the output transform unit in response to receiving the transformation code is configured to apply the transformation corresponding to the transformation code to the first set of sample displacements, thereby generating a second set of sample displacements.

34. The sample generation circuit of claim 33, wherein a set of transformation codes corresponds to a group of eight two-dimensional transformations.

35. The sample generation circuit of claim 34, wherein the transformation control unit is configured to implement a mapping of each state of the first portion of the two-dimensional bin address into a corresponding transformation selected from the group of eight transformations.

36. The sample generation circuit of claim 33, wherein the transformation control unit is a combinational logic network.

37. The sample generation circuit of claim 33, wherein the transformation control unit comprises a lookup table, which stores a transformation code for each state of the first portion of the two-dimensional address.

38. The sample generation circuit of claim 33, wherein the address transform circuit includes two multiplexors and a first XOR gate and a second XOR gate, wherein a first bit of the transformation code controls the two multiplexors.

39. The sample generation circuit of claim 33, wherein the output transform circuit includes two multiplexors and a first XOR gate and a second XOR gate, wherein a first bit of the transformation code controls the two multiplexors.

40. A system for selecting sample locations for a sample bin comprising:

a memory configured to store k sample locations for each bin in an n1×n2 array of sample bins, wherein k, n1, and n2 are positive integers; and a logic circuit configured to generate one or more sample locations for a bin B in sample space by a) selecting a specific transformation from a pre-determined m1×m2 array of transformations and selecting a specific sample bin from the n1×n2 array of sample bins that correspond to the location of bin B in sample space, b) applying the specific transformation identified to one or more of the k sample locations stored in the memory for the specific sample bin, and c) outputting one or more of the transformed sample locations.

41. A system for selecting sample positions for a specific sample bin comprising:

a memory configured to store k sample locations for each bin in an n1×n2 array of sample bins, wherein k, n1, and n2 are positive integers; and a logic circuit configured to generate one or more sample locations for a sample bin B in sample space by a) identifying a first transformation from a pre-determined m1×m2 array of transformations, identifying a second transformation from a pre-determined p1×p2 array of transformations, and identifying a specific sample bin from the n1×n2 array of sample bins, wherein the first and second transformations and the specific sample bin correspond to the location of sample bin B in sample space, b) applying a third transformation that is equivalent to a sequential application of the first and second transformations to one or more of the k sample locations stored in the memory for the specific sample bin, and c) output one or more of the transformed sample locations, wherein m1, m2, p1, and p2 are positive integers.

42. A method for generating a pre-selected pattern of permuted sample locations spanning sample space, the method comprising:

selecting sample locations for each sample bin of an array of sample bins;

storing the sample locations in a sample location memory; and selecting one or more arrays of transformations, wherein a larger pattern of permuted arrays of sample bins is generated by applying the one or more arrays of transformations to the array of sample bins, and wherein the larger pattern of permuted arrays of sample bins is tiled across sample space.

43. A method for processing samples, the method comprising:

receiving a two-dimensional bin address specifying a position of a bin in sample space that contains a portion of a polygon;

identifying a transformation corresponding to the two-dimensional bin address from a pre-selected pattern of transformations that spans sample space;

identifying a specific sample bin from an array of sample bins that corresponds to the two-dimensional bin address;

applying the identified transformation to the pre-selected sample displacements contained in the specific sample bin to output a permuted set of one or more sample displacements;

adding the one or more sample displacements to the two-dimensional bin address to form one or more sample locations;

rendering sample values for the one or more sample locations that are within the polygon;

discarding the sample locations; and storing the sample values in a sample memory.

44. The method of claim 43, further comprising:

reading a set of samples corresponding to an array of sample bins from the sample memory;

regenerating the sample locations used to render the set of samples; and convolving the samples into a set of pixel values.

45. A method for generating reproducible sample locations for a sample bin in sample space, the method comprising:

receiving a two-dimensional bin address specifying a location of the sample bin, wherein the two-dimensional bin address includes an X bin address and a Y bin address;

operating on a first portion of the two-dimensional bin address to identify a corresponding transformation from a pattern of transformations, wherein the first portion comprises a first set of bits in the X bin address and a first set of bits in the Y bin address;

applying an inverse of the identified transformation to a second portion of the two-dimensional address to generate a two-dimensional memory address, wherein the second portion comprises a second set of bits in the X bin address and a second set of bits in the Y bin address;

accessing a first stream of sample displacements from a sample location memory using the two-dimensional memory address;

applying the identified transformation to the first stream of sample displacements to generate a second stream of sample displacements; and adding the second stream of sample displacements to the two-dimensional bin address to determine the sample locations for the sample bin.

* * * * *